US008998099B2

(12) United States Patent
Frey et al.

(10) Patent No.: US 8,998,099 B2
(45) Date of Patent: Apr. 7, 2015

(54) TRANSPARENT MICROPATTERNED RFID ANTENNA AND ARTICLES INCORPORATING SAME

(75) Inventors: Matthew H. Frey, Cottage Grove, MN (US); Lijun Zu, Woodbury, MN (US); William C. Egbert, Minneapolis, MN (US); Swagata R. Banerjee, North Oaks, MN (US); Robert A. Sainati, Bloomington, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/880,180

(22) PCT Filed: Nov. 17, 2011

(86) PCT No.: PCT/US2011/061188
§ 371 (c)(1),
(2), (4) Date: Apr. 18, 2013

(87) PCT Pub. No.: WO2012/082300
PCT Pub. Date: Jun. 21, 2012

(65) Prior Publication Data
US 2013/0264390 A1 Oct. 10, 2013

Related U.S. Application Data

(60) Provisional application No. 61/423,769, filed on Dec. 16, 2010.

(51) Int. Cl.
*G06K 19/06* (2006.01)
*G06K 19/077* (2006.01)
(Continued)

(52) U.S. Cl.
CPC ........ *G06K 19/07773* (2013.01); *H01Q 1/2225* (2013.01); *H01Q 1/38* (2013.01); *H01Q 7/00* (2013.01); *G06K 19/07783* (2013.01)

(58) Field of Classification Search
CPC ... G07F 7/1008; G07F 7/08; G06K 19/07749; G06K 19/0723; G06K 19/077; G06K 19/07783; G06K 19/07773; G06Q 20/341; G06Q 20/04; G06Q 20/40; H01Q 1/2225; H01Q 1/38; H01Q 7/00
USPC .................................. 235/492, 380, 493, 449
See application file for complete search history.

(56) References Cited

U.S. PATENT DOCUMENTS 5,512,131 A  4/1996  Kumar
5,882,774 A  3/1999  Jonza
(Continued)

FOREIGN PATENT DOCUMENTS

EP    0 911 906      3/2006
JP    2003-209421    7/2003
(Continued)

OTHER PUBLICATIONS

Hautcoeur et al., "Optically transparent monopole antenna with high radiation efficiency manufactured with silver grid layer (AgGL)", Electronics Letters, vol. 45, No. 20, Sep. 24, 2009, pp. 1014-1016.
(Continued)

*Primary Examiner* — Sonji Johnson
(74) *Attorney, Agent, or Firm* — Adrian L. Pishko

(57) ABSTRACT

Antennas suitable for use in RFID devices include an insulating substrate and a first conductive micropattern disposed on or in the substrate, the first conductive micropattern defining a contiguous mesh conductor. The first conductive micropattern forms an antenna responsive to at least a frequency of 915 MHz, and includes interconnected traces having a trace width in a range from 0.5 to 20 microns. Furthermore, the first conductive micropattern is characterized by an open area fraction of at least 80% or 90%. RFID devices include such an antenna and an integrated circuit configured to transmit and receive signals using the antenna. Cards, such as financial transaction cards or identification cards, include such an antenna carried by a card layer.

19 Claims, 12 Drawing Sheets

(51) Int. Cl.
*H01Q 1/22* (2006.01)
*H01Q 1/38* (2006.01)
*H01Q 7/00* (2006.01)

(56) References Cited

U.S. PATENT DOCUMENTS

| | | |
|---|---|---|
| 6,399,258 B2 | 6/2002 | O'Brien |
| 6,693,541 B2 | 2/2004 | Egbert |
| 6,805,940 B2 | 10/2004 | Koskenmaki |
| 6,816,125 B2 | 11/2004 | Kuhns |
| 7,233,296 B2 | 6/2007 | Song |
| 7,268,687 B2 | 9/2007 | Egbert |
| 7,271,951 B2 | 9/2007 | Weber |
| 7,306,158 B2 | 12/2007 | Berardi |
| 7,315,248 B2 | 1/2008 | Egbert |
| 7,324,061 B1 | 1/2008 | Hadley |
| 7,417,550 B2 | 8/2008 | Brown |
| 7,656,357 B2 * | 2/2010 | Ishibashi et al. .............. 343/713 |
| 2002/0018880 A1 | 2/2002 | Young |
| 2003/0075608 A1 | 4/2003 | Atherton |
| 2003/0142018 A1 * | 7/2003 | Lange ............... 343/700 MS |
| 2003/0151028 A1 | 8/2003 | Lawrence |
| 2004/0175515 A1 | 9/2004 | Lawrence |
| 2006/0109192 A1 | 5/2006 | Weigand |
| 2006/0196948 A1 | 9/2006 | Weber |
| 2007/0194133 A1 * | 8/2007 | Mimura ................... 235/492 |
| 2007/0200680 A1 | 8/2007 | Colby |
| 2008/0149731 A1 | 6/2008 | Arai |
| 2008/0223925 A1 * | 9/2008 | Saito et al. ................. 235/380 |
| 2008/0266183 A1 | 10/2008 | Takei |
| 2008/0315311 A1 | 12/2008 | Okamoto |
| 2009/0051620 A1 | 2/2009 | Ishibashi |
| 2009/0115577 A1 * | 5/2009 | Kobayashi et al. .......... 340/10.1 |
| 2009/0140938 A1 | 6/2009 | Ishibashi |
| 2009/0321529 A1 | 12/2009 | Jesme |
| 2012/0082825 A1 | 4/2012 | Zu |
| 2012/0268338 A1 * | 10/2012 | Yoo et al. .................... 343/803 |

FOREIGN PATENT DOCUMENTS

| | | | |
|---|---|---|---|
| WO | WO 00/42678 | 7/2000 | |
| WO | WO 03/036757 | 5/2003 | |
| WO | WO 03/038748 | 5/2003 | |
| WO | WO 2006/104792 | 10/2006 | |
| WO | WO 2008/047953 | 4/2008 | |
| WO | WO 2009/108765 | 9/2009 | |
| WO | WO 2009/108771 | 9/2009 | |
| WO | WO 2009/154812 | 12/2009 | |
| WO | WO 2010/099132 | 9/2010 | |
| WO | WO 2010099132 A2 * | 9/2010 | ............. G06F 3/041 |
| WO | WO 2010/151471 | 12/2010 | |
| WO | WO 2011/002617 | 1/2011 | |

OTHER PUBLICATIONS

K. Finkenzeller, "RFID Handbook. Radio-Frequency Identification Fundamentals and Applications," (1999 John Wiley & Sons Ltd. Chichester, West Sussex, England), Table of Contents.
European Search Report, EP Application No. 11849171.1, dated Jul. 1, 2014, 3 pages.

* cited by examiner

TRANSPARENT MICROPATTERNED RFID ANTENNA AND ARTICLES INCORPORATING SAME

FIELD OF THE INVENTION

This invention relates generally to radio frequency identification (RFID) devices, with particular application to antennas used in such devices. The invention also relates to associated articles, systems, and methods.

BACKGROUND

Radio-Frequency Identification (RFID) technology has become widely used in many industries, including transportation, shipping, manufacturing, waste management, postal tracking, airline baggage reconciliation, and highway toll management. RFID tags and labels are useful for tracking shipments from the supplier to the customer and even through the customer's supply chain.

A typical RFID system includes a plurality of RFID tags or labels, at least one RFID reader or detection system having an antenna for communication with the RFID tags or labels, and a computing device to control the RFID reader. An RFID tag may or may not include a layer of adhesive. An RFID label typically is an RFID tag having a layer of adhesive for attaching the RFID tag to an item. The RFID reader includes a transmitter that may provide energy or information to the tags or labels, and a receiver to receive identity and other information from the tags or labels. The computing device can read, and/or write, and processes the information obtained by the RFID reader.

In general, the information received from an RFID tag or label is specific to the particular application, but often provides an identification for an article to which the tag is affixed. Exemplary articles include manufactured items, shipping containers, books, files, animals, or virtually any other tangible article. Additional information may also be provided for the article. The tag or label may be used during a manufacturing process, for example, to indicate a paint color of an automobile chassis during manufacturing or other useful information.

The transmitter of the RFID reader outputs RF signals through its antenna to create an electromagnetic field that enables the tags or labels to return an RF signal carrying the information. The transmitter makes use of an amplifier to drive its antenna with a modulated output signal.

A conventional RFID tag or label may be an "active" tag or label that includes an internal power source, or a "passive" tag or label that is energized by the field created by the RFID reader antenna. Once energized, the tags and labels communicate using a pre-defined protocol, allowing the RFID reader to receive information from one or more tags or labels. The computing device serves as an information management system by receiving the information from the RFID reader and performing some action, such as updating a database. In addition, the computing device may serve as a mechanism for programming data into the tags or label via the transmitter.

A variety of methods of making RFID tags and circuits are known, including the following: U.S. Pat. No. 6,805,940 (Koskenmaki et al.); U.S. Pat. No. 6,816,125 (Kuhns et al.); U.S. Pat. No. 6,399,258 (O'Brien et al.); U.S. Patent Application Publication US 2003/0151028 (Lawrence et al.); U.S. Patent Application Publication US 2004/0175515 (Lawrence et al.); U.S. Patent Application Publication US 2002/0018880 (Young); PCT Publication WO 03/038748 (Leerkamp et al.); and PCT Publication WO 00/42678 (Vega et al.).

BRIEF SUMMARY

Electrical conductors in the form of a micropatterned conductive material are known. In these constructions, a layer of metal or other suitable electrically conductive material is disposed on an electrically insulating substrate. The metal layer is micropatterned to form a two-dimensional mesh of conductive linear features. Exemplary micropatterned conductors are described in one or more of the following patent documents: PCT Publications WO 2009/108765 (Frey et al.), WO 2009/108771 (Zu et al.), WO 2009/154812 (Frey et al.), and WO 2010/099132 (Moran et al.).

Although such patterned conductors can be made to have a low visibility or high transparency by using a pattern that has a large "open area fraction", the suitability of such conductors for certain specific applications is unknown. In particular, the suitability of such conductors for use as antennas in RFID applications is unknown and uncertain. We have studied several high transparency micropatterned conductors, paying particular attention to micropatterned conductors having an open area fraction of, for example, at least 90%, or at least 95%, or in a range from 95-98%, and assessed their suitability as antennas in certain RFID applications. This was done by fabricating a variety of RFID devices using a variety of high transparency micropatterned conductors as antennas, and testing the resulting devices with an RFID reader.

The results of these studies show that such high transparency micropatterned conductors, sometimes also referred to as conductive micropatterns, can be made to be useful in some RFID devices, but are not as useful in other RFID devices. RFID devices come in different sizes, shapes, and designs, depending on, among other things, the electromagnetic frequency they are designed to operate at. Some RFID devices are designed to operate at a frequency in the Low Frequency (LF) portion of the electromagnetic spectrum, i.e., in the portion of the electromagnetic spectrum ranging from 30 KHz to 300 KHz. Other RFID devices are designed to operate at a frequency in the High Frequency (HF) portion of the electromagnetic spectrum, i.e., in the portion of the electromagnetic spectrum ranging from 3 MHz to 30 MHz. Still other RFID devices are designed to operate at a frequency in the Ultra High Frequency (UHF) portion of the electromagnetic spectrum, i.e., in the portion of the electromagnetic spectrum ranging from 300 MHz to 3 GHz. In the United States, particular frequencies that are reserved for RFID devices include 13.56 MHz in the HF region, and 902-928 MHz in the UHF region. Other countries or regions of the world reserve other specific frequencies for RFID use. The 902-928 MHz frequency used in the United States lies within a wider band of UHF frequencies used for RFID applications that ranges from 868 MHz to 956 MHz. Other countries utilize different frequencies within this wider UHF band for RFID. For example, several European countries reserve 868 MHz for RFID use. In Japan, 956 MHz is reserved for RFID use.

We have found that high transparency micropatterned metallic conductors, exhibiting an open area fraction of at least 90%, or at least 95%, can be made suitable for RFID antennas operating in the UHF portion of the electromagnetic spectrum, e.g., for RFID antennas operating at 915 MHz or in a range from 860 MHz to 960 MHz.

The present application therefore discloses, inter alia, antennas suitable for use in RFID devices. The antennas may include an insulating substrate and a first conductive micropattern disposed on or in the substrate, the first conductive micropattern defining a contiguous mesh conductor. The first conductive micropattern may form an antenna responsive to at least a frequency of 915 MHz, and may comprise interconnected traces having a trace width in a range from 0.5 to 20 microns. Furthermore, the first conductive micropattern may be characterized by an open area fraction of at least 80% or at least 90%.

In some cases, the open area fraction may be at least 95%, or in a range from 95 to 98%. In some cases, the first conductive micropattern may be composed of an opaque material comprising a metal. In some cases, the metal is selected from silver, gold, palladium, platinum, aluminum, copper, nickel, tin, alloys, and combinations thereof. In some cases, the first conductive micropattern may have a thickness of less than 2 microns, or less than 1 micron, or in a range from 30 nanometers to 1 micron. In some cases, the trace width may be in a range from 1 to 10 microns, or from 1 to 5 microns, or from 1.5 to 4 microns. In some cases, the trace width may be less than 5 microns, less than 2 microns, or less than 1 micron. In some cases, the first conductive micropattern may be characterized by an effective sheet resistance in a range from 0.1 to 200 ohms/square, or in a range from 1 to 50 ohms/square. In some cases, the insulating substrate may be transparent. In some cases, the antenna may have a visible light transmission value of greater than 50%, greater than 70%, or greater than 90%.

We also disclose RFID devices that include any of the foregoing antennas in combination with an integrated circuit configured to transmit and receive signals using the antenna. In some cases, the antenna may be tailored to yield a maximum distance at which an RFID reader operating at 1 Watt radiated power in a 902-928 MHz frequency hopping mode can communicate with the device. The maximum distance may, for example, be in a range from 1 centimeter to 2 meters, or from 1.5 centimeters to 1 meter, or from 2 to 50 centimeters, or from 2.5 to 30 centimeters.

We also disclose RFID systems comprising a device that includes an antenna as described above in combination with an integrated circuit, and an RFID reader operating at between 0.2 Watt and 5 Watts radiated power at a frequency or frequencies between 860 MHz and 960 MHz, wherein the antenna is tailored so that the maximum distance at which the RFID reader can communicate with the device is in a range from 1 centimeter to 2 meters, or from 1.5 centimeters to 1 meter, or from 2 centimeters to 50 centimeters, or from 2.5 centimeters to 30 centimeters. In some cases the maximum distance is less than 30 centimeters, less than 10 centimeters, or less than 5 centimeters.

We also disclose cards that include a card layer, an antenna carried by the card layer, and an integrated circuit configured to transmit and receive signals using the antenna. The antenna may include a conductive micropattern defining a contiguous mesh conductor, the conductive micropattern forming an antenna responsive to at least a frequency of 915 MHz. The conductive micropattern may also include interconnected traces having a trace width in a range from 0.5 to 20 microns, and the conductive micropattern may be characterized by an open area fraction of at least 80% or at least 90%. In some cases, the card layer may be light transmissive for visible wavelengths. In some cases, the open area fraction may be in a range from 95 to 98%. In some cases, the first conductive micropattern may be composed of an opaque material comprising a metal selected from silver, gold, palladium, platinum, aluminum, copper, nickel, tin, alloys, and combinations thereof. In some cases, the first conductive micropattern may have a thickness of less than 2 microns, or less than 1 micron, or in a range from 30 nanometers to 1 micron. In some cases, the trace width may be in a range from 0.5 to 20 microns, or from 1 to 10 microns, or from 1 to 5 microns, or from 1.5 to 4 microns. In some cases, the trace width may be less than 5 microns, less than 2 microns, or less than 1 micron.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

We describe herein, among other things, high transparency conductive structures that we have found to be useful as antennas for certain RFID devices, and articles incorporating such antennas, such as identification cards and transaction cards. Thus, cards or other articles can incorporate high transparency micropatterned conductors in the form of RFID antennas that have the combination of reduced visibility and sufficient electromagnetic properties to receive or transmit information in the form of radio frequency signals. Suitable conductors include metals, polymers, metal oxides, and composites, discussed further below. Especially preferred conductors are metals. Exemplary micropatterned conductors are characterized by certain properties or characteristics, such as the open area fraction of the micropattern, the thickness of the conductive traces, and the transverse width of the conductive traces. The open area fraction of the micropattern is preferably more than 80, 90, or 95%, or in a range from 95 to 98%. The thickness of the conductive traces is preferably in a range from 20 nanometers to 10 micrometers (microns), or less than 2 microns, or less than 1 micron, or in a range from 30 nanometers to 1 micron. The transverse width of the conductive traces is preferably in a range from 0.1 to 20 micrometers, or from 0.5 to 20 microns, or from 0.5 to 10 microns, or from 1 to 5 micrometers, or from 1.5 to 4 micrometers, or less than 20, 10, 6, 5, 4, 3, 2, or 1 micron.

Figure 1:
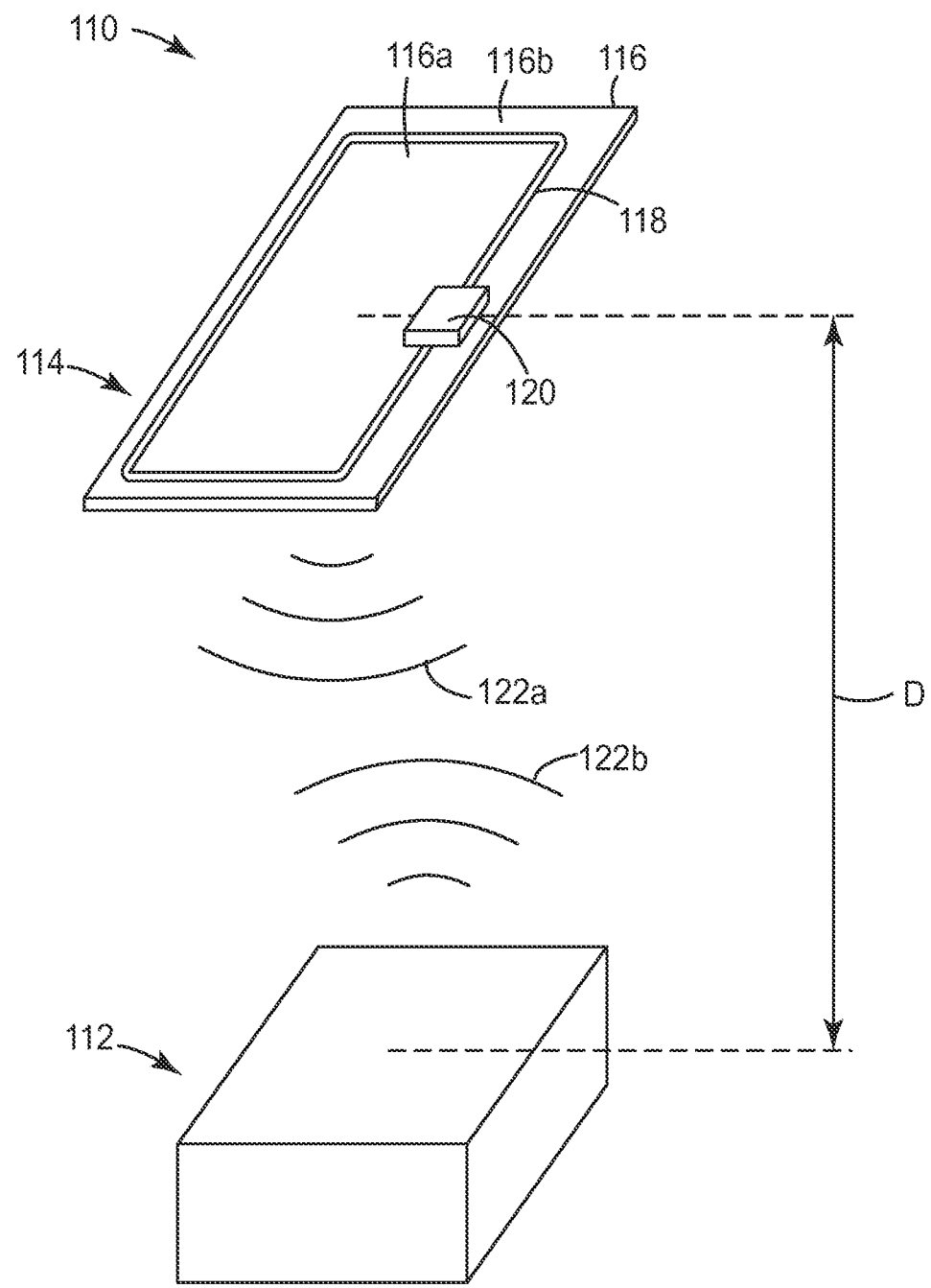
FIG. 1 is a schematic isometric view of an RFID system including an RFID device and an RFID reader.

In FIG. 1, an exemplary RFID system 110 includes an RFID reader 112 and an RFID device 114, which may be or comprise an active or passive RFID tag or label. The reader 112 emits electromagnetic signals 122b at a particular frequency or frequencies tailored for reception by the RFID device 114. The reader 112 also receives and detects electromagnetic signals 122a that are emitted by the device 114, where the signals 122a are typically of the same or similar frequency as signals 122b. The signals 122a may be modulated to include information about the device 114, or about an article to which the device 114 is attached or in which the device is embedded.

The RFID device 114 includes an electrically insulating substrate 116 and an antenna 118 formed on or in the substrate. The antenna 118 is characterized by a high transparency electrically conductive region that is suitably shaped to receive and transmit electromagnetic radiation of the appropriate frequency. The conductive region is distinguished from non-conductive regions 116a, 116b of the substrate 116. The micropatterned nature of the high transparency conductive region is discussed further below.

The substrate 116 may comprise any suitable dielectric or other non-conducting material. The substrate 116 may consist essentially of a single layer of material, or it may include additional layers and have a more complex construction. The substrate 116 may be rigid or flexible as desired. Also, although in exemplary embodiments the substrate 116 is substantially light transmissive, e.g., transparent or translucent, in other cases the substrate may have only a low level of light transmission, or it may even be opaque. Examples of suitable substrates include polymer films such as polyethylene terephthalate (PET) or polyethylene naphthalate (PEN). Other suitable substrates include multilayer optical films and related films, reflectors, polarizers, filters, and articles, such as any of those disclosed in U.S. Pat. No. 5,882,774 (Jonza et al.) or U.S. Pat. No. 7,271,951 (Weber et al.), both of which are incorporated herein by reference. In cases where the RFID device 114 is part of a transparent or clear transaction or identification card, in which an infrared-blocking film or filter is also included in the card construction, the antenna may be disposed directly on the infrared-blocking film. In one embodiment, the infrared-blocking film may be or comprise a multilayer optical film composed of alternating polymer layers whose refractive indices and thicknesses are tailored to provide a high transmission for normally incident visible light, e.g. an average transmission of at least 70% from 400-700 nm, but to substantially block near infrared light, e.g., it may have an average transmission for normally incident light from 800 to 1000 nm of no greater than 8%, or no greater than 5%. The substrate 116 with the applied antenna 118 can be laminated with other materials to form the card, or to form other desired articles, by methods that are known in the field.

The antenna 118 geometry and properties depend on the desired operating frequency of the RFID device 114. For example, RFID devices operating at 902-928 MHz or 2.45 GHz would typically include a dipole antenna, such as a linear dipole antenna or folded dipole antenna, or a single turn loop antenna. In contrast, an RFID device operating at 13.56 MHz (or similar) would typically use a spiral or multi-turn coil antenna. However, these generalizations should not be interpreted as limiting, and other antenna designs are known to those skilled in the art. In any case, the antenna 118 intercepts the radio frequency energy 122b radiated by an interrogation source or reader 112. This signal energy can carry both power and commands (or other information) to the device 114. The antenna 118 may allow the RFID device to absorb energy sufficient to power an integrated circuit 120, discussed further below, and thereby provide the response to be detected. The characteristics of the antenna should thus be matched to the system in which it is incorporated. In the case of RFID devices operating in the high MHz to GHz range, an important characteristic is the antenna length. Typically, the effective length of a dipole antenna is selected so that it is close to a half-wavelength or multiple half-wavelength of the interrogation signal. In the case of RFID devices operating in the low to mid MHz region (13.56 MHz, for example), where a half wavelength antenna is impractical due to size limitations, some important characteristics are antenna inductance and the number of turns of the antenna coil. For both antenna types, good electrical conductivity is needed. Furthermore, for maximum energy transfer between the antenna and the integrated circuit, the input impedance of the integrated circuit should match the impedance of the antenna. Additional information about antennas is known to those of ordinary skill in the art from, for example, reference texts such as K. Finkenzeller, "RFID Handbook. Radio-Frequency Identification Fundamentals and Applications," (1999 John Wiley & Sons Ltd, Chichester, West Sussex, England).

We have found that the conductor micropattern of the antenna can be designed to achieve an efficiency that is deliberately tailored to be less than the efficiency of an analogous opaque, thick metal (e.g., 18 micrometer thick copper) antenna. A specific, lower level of antenna efficiency can be useful, for example, for tailoring the distance over which the antenna will provide for communication between the RFID device and an interrogation source or reader operating with a given set of parameters. For example, a transparent or covert antenna design comprising a conductor micropattern in the form of a mesh, based on our findings, can be tailored to yield a maximum distance at which a reader is still able to successfully communicate with the RFID device. Such a maximum distance may be between 1 centimeter and 2 meters, or between 1.5 centimeters and 1 meter, or between 2 and 50 centimeters, or between 2.5 and 30 centimeters, for example. Alternately, such a maximum distance may be less than 30 centimeters, less than 10 centimeters, or less than 5 centimeters. These ranges of maximum communication distance can be achieved for RFID devices operating in the UHF region. Keeping the maximum distance with a limited range can advantageously reduce opportunities for thieves or hackers to read or interrogate an RFID device that contains sensitive information, e.g., where the RFID device is part of a financial transaction card or identification card. The relation between transmitted power from the reader and received power by the RFID device is given by the Friis Equation, which is discussed further below. The ranges of maximum communication distance can be achieved for specific desired RFID operating ranges, e.g., for RFID interrogation sources or readers for US operation: 902-928 MHz, frequency hopping mode, and 1 Watt equivalent radiated power.

An integrated circuit (IC) 120 connects to the antenna 118 so that the IC can communicate with the RFID reader 112. The IC 120 can provide the primary identification function of the RFID device 114. The IC may thus include software and circuitry to permanently store the tag identification and other desirable information, interpret and process commands received from the interrogation hardware, respond to requests for information by the interrogator, and assist the hardware in resolving conflicts resulting from multiple tags responding to interrogation simultaneously. The IC may optionally provide for updating the information stored in its memory (read/write) rather than simply reading the information out (read only). Integrated circuits 120 suitable for use in RFID devices 114 include those available from Texas Instruments (Dallas, Tex.) (e.g. their TAG-IT line of products), NXP Semiconductors (Eindhoven, Netherlands) (e.g. their I-CODE, MIFARE, or HITAG line of products), and ST Microelectronics (Geneva, Switzerland), among others.

FIG. 1 shows the RFID device 114 as being oriented in an aligned fashion with the RFID reader 112. That is, an axis perpendicular to the substrate 116 and passing through a central point of the antenna 118 also intersects the RFID reader 112. FIG. 1 also shows the device 114 and reader 112 as being spaced apart by a distance D. One figure of merit with which to assess or evaluate the performance of a given RFID device is the greatest distance D at which the reader 112 is still able to successfully and reliably communicate with the RFID device 114. This greatest distance is referred to herein as Dmax. At distances D greater than Dmax, the reader 112 is not able to successfully communicate with the RFID device 114. In terms of the Friis Equation, Dmax may be understood as the distance beyond which the received power $P_r$ is insufficient to turn on the silicon die in the RFID device.

Figure 2:
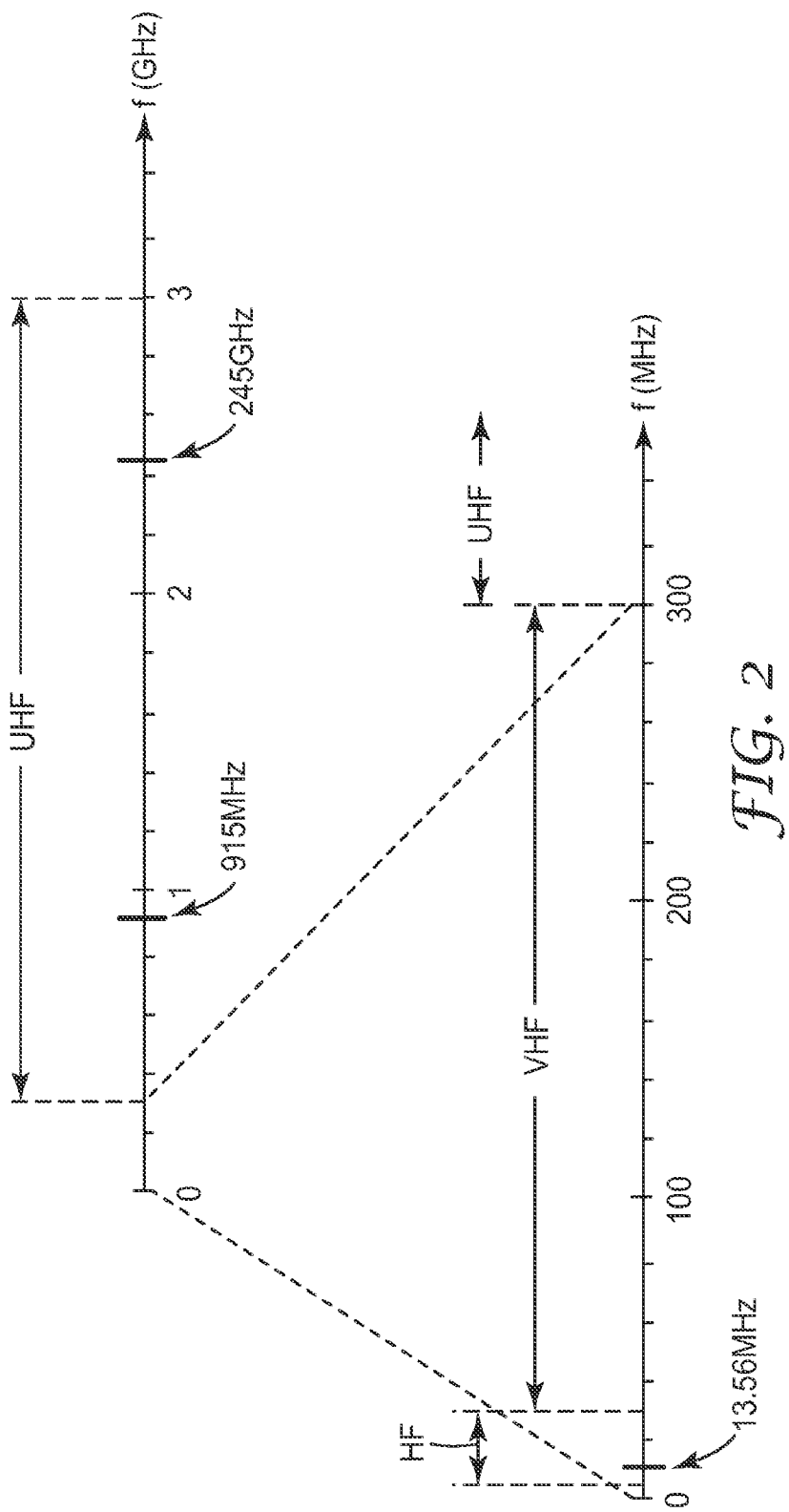
FIG. 2 is a diagram showing portions of the electromagnetic spectrum, including the High Frequency (HF), Very High Frequency (VHF), and Ultra High Frequency (UHF) portions of the spectrum.

FIG. 2 depicts pertinent portions of the electromagnetic spectrum, as represented by the frequency f of the electromagnetic radiation. The upper linear scale depicts frequencies ranging from 0 to over 3 GHz; the lower linear scale shows frequencies from 0 to over 300 MHz on an expanded scale. The scales collectively illustrate the High Frequency (HF) range, which extends from 3 MHz to 30 MHz, the Very High Frequency (VHF) range, which extends from 30 MHz to 300 MHz, and the Ultra High Frequency (UHF) range, which extends from 300 MHz to 3 GHz. Also shown are the specific frequencies of 13.56 MHz, 915 MHz, and 2.45 GHz, which are relevant to RFID systems in the United States. The 915 MHz frequency lies at the center of the 902-928 MHz band for the U.S., and within the wider band of UHF frequencies ranging from 868 MHz to 956 MHz mentioned above.

Before describing the high transparency micropatterned conductors in more detail, we turn to some antenna designs that were fabricated and tested.

Figure 3:
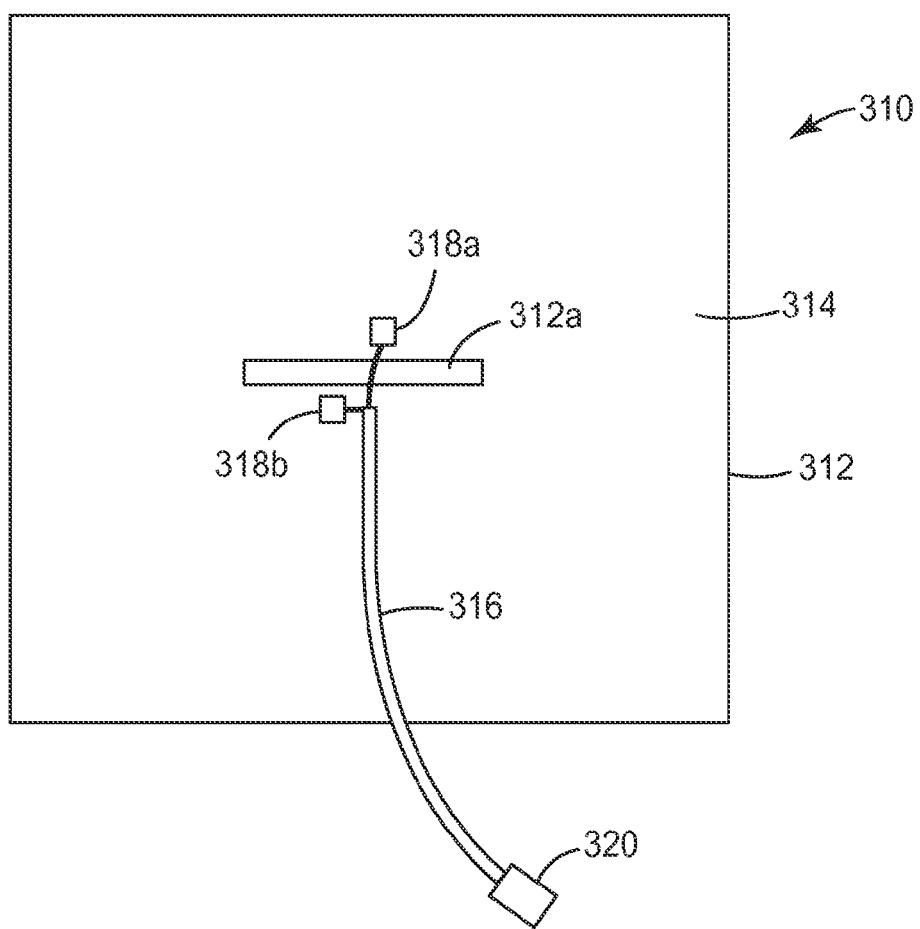
FIG. 3 is a schematic front or top view of a slot antenna that was tested at a UHF frequency.

In FIG. 3, a slot antenna device 310 is shown. The device 310 includes a nominally square-shaped insulating substrate 312. A conductive layer is disposed on or in the substrate 312 so as to cover all regions thereof except for a non-conductive slot region 312*a*, the conductive layer thus forming a slot antenna 314. In an exemplary embodiment, the conductive layer comprises a high transparency micropatterned conductor, the design of which is discussed further below. Dimensions of the device 310 can be selected as appropriate to operate in a given frequency range of interest. In one example, the outer border of the substrate 312 or antenna 314 forms a square about 15 cm by 15 cm, and the slot region 312*a* has dimensions of 5 cm by 0.5 cm. These dimensions should not be construed as limiting.

A coaxial cable 316 or other suitable cable may be connected to suitable portions of the antenna 314 at or near the center of the slot region 312*a* via contact pads 318*a*, 318*b* as shown. The contact pads may, for example, be or comprise copper tape tabs adhered to the conductive layer via an electrically conductive adhesive or the like. The cable 316 includes a connector 320 to facilitate connecting the antenna 314 to test equipment that can detect or measure signals received by the antenna 314, and that can send drive signals to the antenna 314 to cause it to emit electromagnetic radiation. In an alternative embodiment, the cable 316 can be omitted, and an IC or other suitable RFID circuit can be mounted on the antenna 314 at or near the center of the slot region 312*a*.

Antennas of the design shown in FIG. 3 were fabricated and tested. Design details of the antennas and testing results are provided below in the Examples section.

FIGS. 4*a-e* show additional antenna designs. The antennas of FIGS. 4*a-c* have a coiled or spiral design suitable for use at HF frequencies such as 13.65 MHz; the antennas of FIGS. 4*d* and 4*e* have dipole or folded dipole designs suitable for use at UHF frequencies, such as 915 MHz.

Figure 4A:
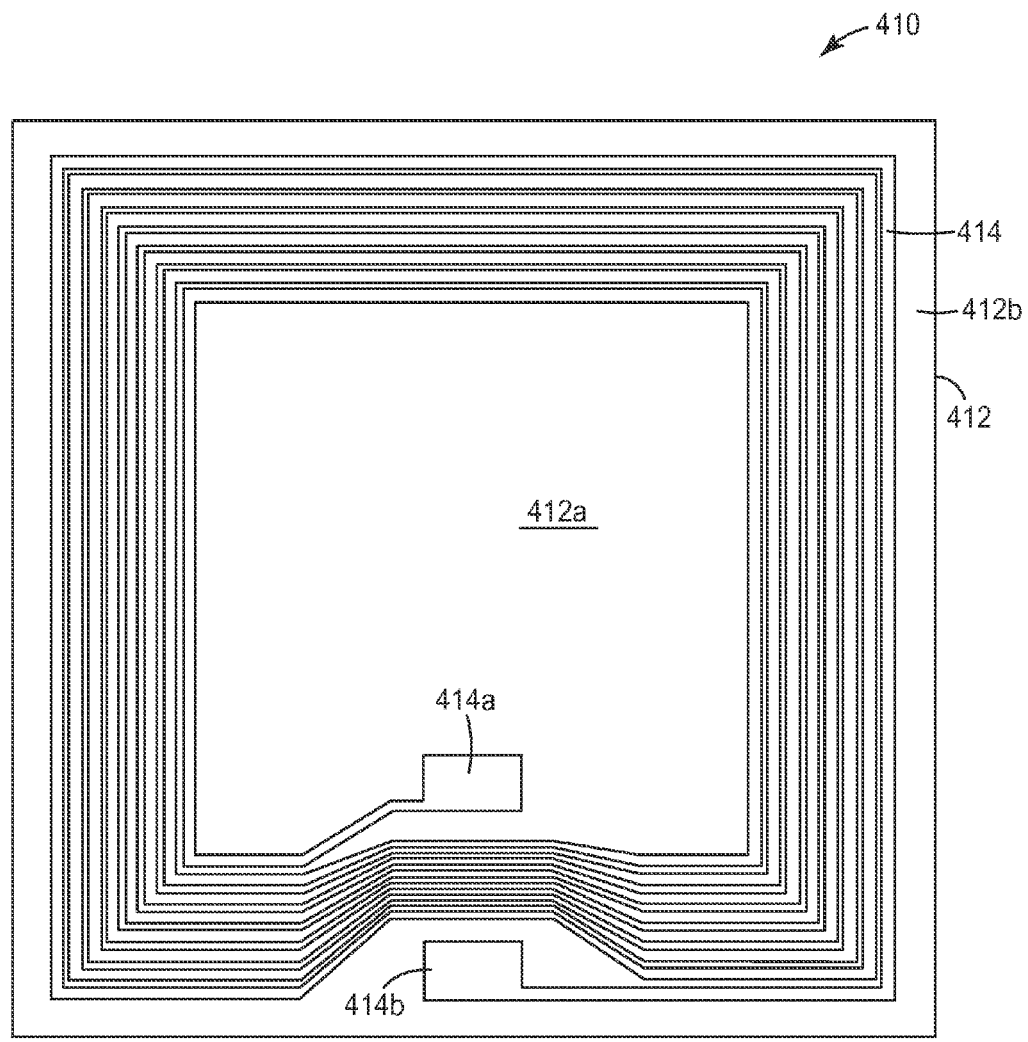
FIGS. 4a, 4b, and 4c are schematic front, top, or plan views of different RFID antennas designed for use at HF frequencies.

In FIG. 4*a*, an antenna device 410 includes a substrate 412 having non-conductive regions 412*a*, 412*b*, and a conductive region formed into a spiral shape to provide an antenna 414. The non-conductive regions 412*a*, 412*b* are topographically connected to each other by a spiral-shaped non-conductive region (not labeled). At opposite ends of the antenna 414, contact pads 414*a*, 414*b*, which may optionally be solid (i.e., not micropatterned in the form of a mesh), are formed. If desired, a suitable IC can be mounted to the device 410 so as to couple to the antenna 414 via the contact pads 414*a*, 414*b*.

Figure 4B:
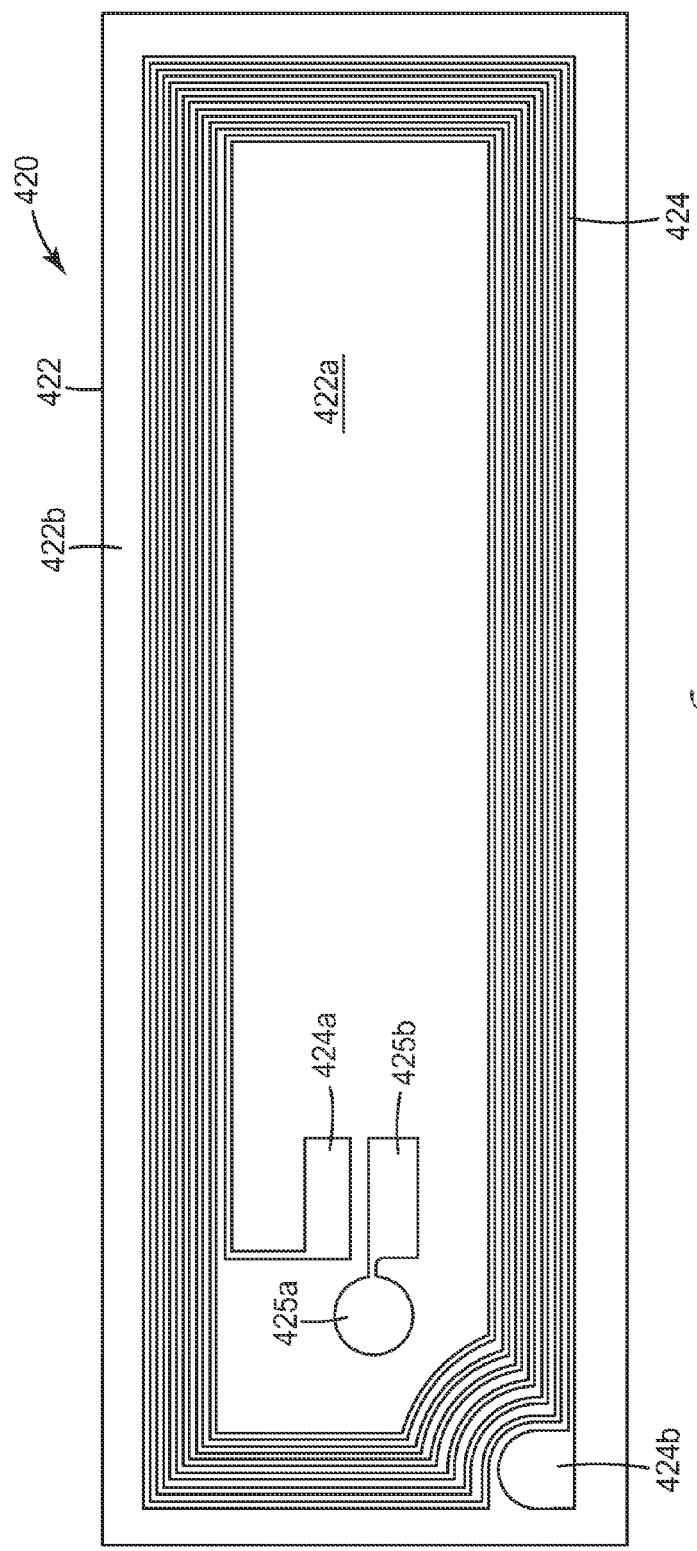

In FIG. 4*b*, an antenna device 420 includes a substrate 422 having non-conductive regions 422*a*, 422*b*, and a conductive region formed into a spiral shape to provide an antenna 424. The non-conductive regions 422*a*, 422*b* are topographically connected to each other by a spiral-shaped non-conductive region (not labeled). At opposite ends of the antenna 424, contact pads 424*a*, 424*b*, which may optionally be solid (i.e., not micropatterned in the form of a mesh), are formed. Additional contact pads are provided on or in the substrate to provide auxiliary contact pads 425*a*, 425*b*, which may optionally be solid (i.e., not micropatterned in the form of a mesh). If desired, the contact pad 424*b* can be connected to contact pad 425*a* with a jumper wire of the like, and a suitable IC can be mounted to the device 420 so as to couple to the antenna 424 via the contact pads 424*a*, 425*b*.

Figure 4C:
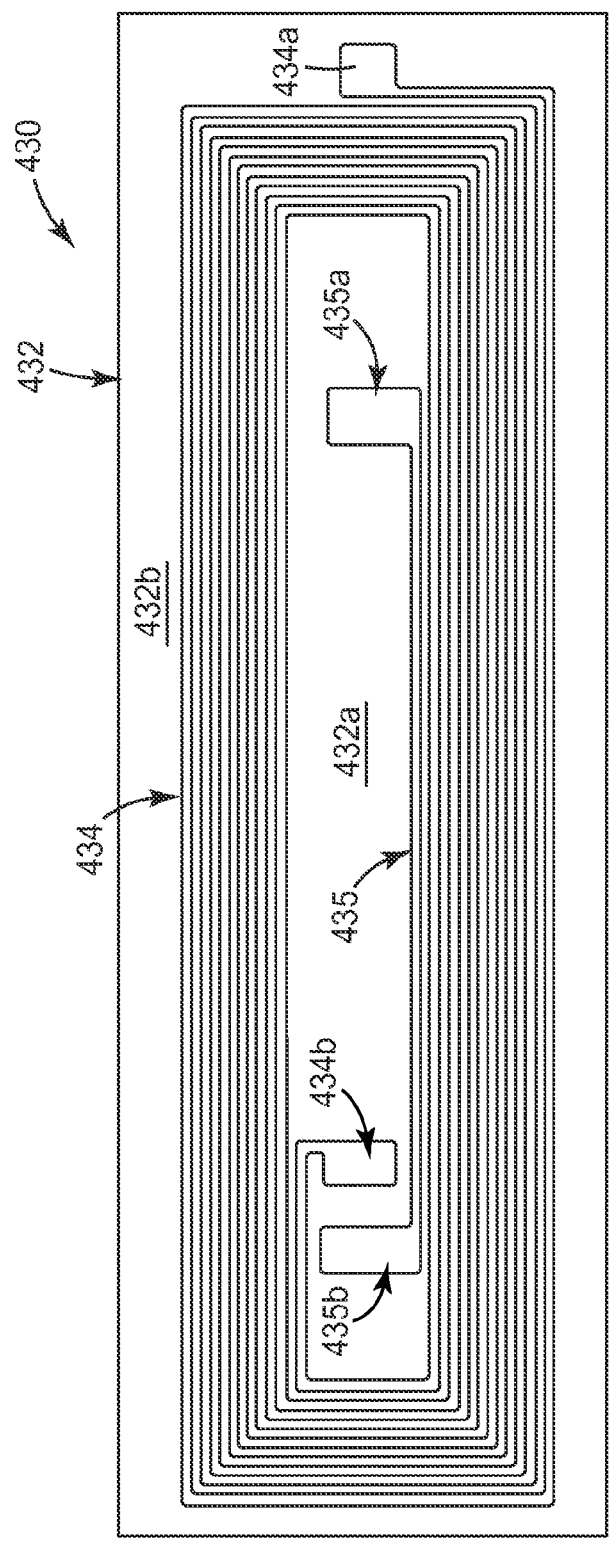

In FIG. 4*c*, an antenna device 430 includes a substrate 432 having non-conductive regions 432*a*, 432*b*, and a conductive region formed into a spiral shape to provide an antenna 434. The non-conductive regions 432*a*, 432*b* are topographically connected to each other by a spiral-shaped non-conductive region (not labeled). At opposite ends of the antenna 434, contact pads 434*a*, 434*b*, which may optionally be solid (i.e., not micropatterned in the form of a mesh), are formed. Another conductive mesh region 435 is provided on or in the substrate to provide auxiliary contact pads 435*a*, 435*b*. If desired, the contact pad 434*a* can be connected to contact pad 435*a* with a jumper wire or the like, and a suitable IC can be mounted to the device 430 so as to couple to the antenna 434 via the contact pads 434*b*, 435*b*.

Figure 4D:
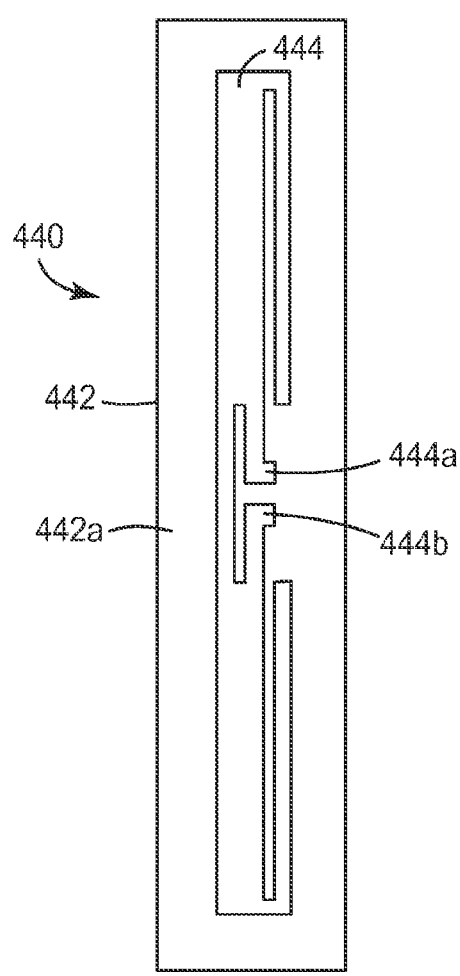
FIGS. 4d and 4e are schematic front, top, or plan views of different RFID antennas designed for use at UHF frequencies.

In FIG. 4*d*, an antenna device 440 includes a substrate 442 having a non-conductive region 442*a* and a conductive region formed into a folded dipole shape to provide an antenna 444. Portions 444a, 444b of the antenna, which may optionally be solid (i.e., not micropatterned in the form of a mesh), can be used as contact pads. If desired, a suitable IC can be mounted to device 440 so as to couple to the antenna 444 via the contact pads 444a, 444b.

Figure 4E:
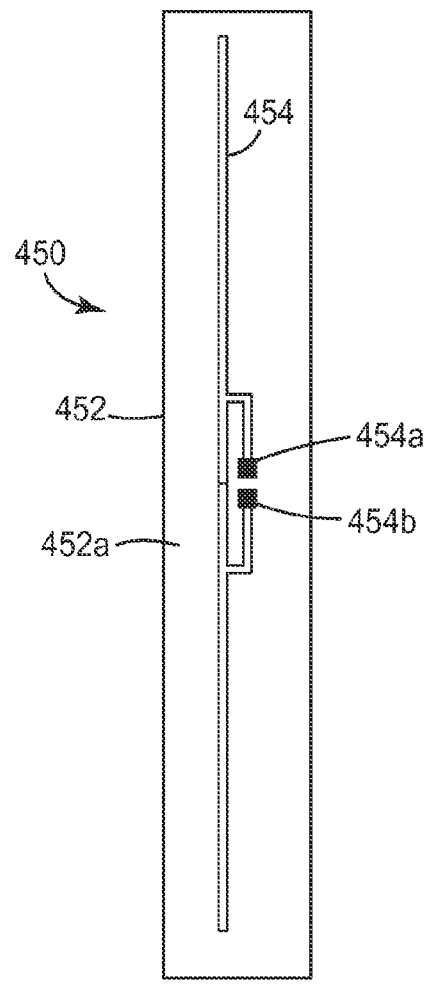

In FIG. 4e, an antenna device 450 includes a substrate 452 having a non-conductive region 452a and a conductive region formed into a folded dipole shape to provide an antenna 454. Portions 454a, 454b of the antenna, which may optionally be solid (i.e., not micropatterned in the form of a mesh), can be used as contact pads. If desired, a suitable IC can be mounted to device 450 so as to couple to the antenna 454 via the contact pads 454a, 454b.

In exemplary embodiments, the conductive region(s) of the disclosed RFID antennas are provided by a low visibility or high transparency micropatterned conductive material in the form of a mesh. In these constructions, a layer of metal or other suitable electrically conductive material is disposed on or in an electrically insulating substrate. The metal layer is micropatterned to form a two-dimensional contiguous mesh comprising interconnected traces. In this regard, a "contiguous mesh comprising interconnected traces," refers to a pattern of conductive traces that form a network or grid that defines open cells, wherein the network or grid is electrically connected from cell to cell (without breaks). Exemplary mesh or micropattern geometries are described elsewhere herein. In some cases, in order to preserve the optical uniformity of the device and/or to make the antenna more difficult to detect, the mesh or micropattern may extend uniformly over both conductive regions (where the mesh is contiguous) and non-conductive regions, but selective breaks in the mesh pattern (yielding a "broken mesh") are provided in the non-conductive regions to render those regions non-conductive, as is described further below. The selective breaks produce a collection of metal segments that are not electrically connected to each other but that act as "dummy" elements or electrically floating elements whose primary purpose is to preserve optical uniformity. In some cases, the "dummy" elements can be omitted entirely from one, some, or all of the non-conductive areas.

Figure 5:
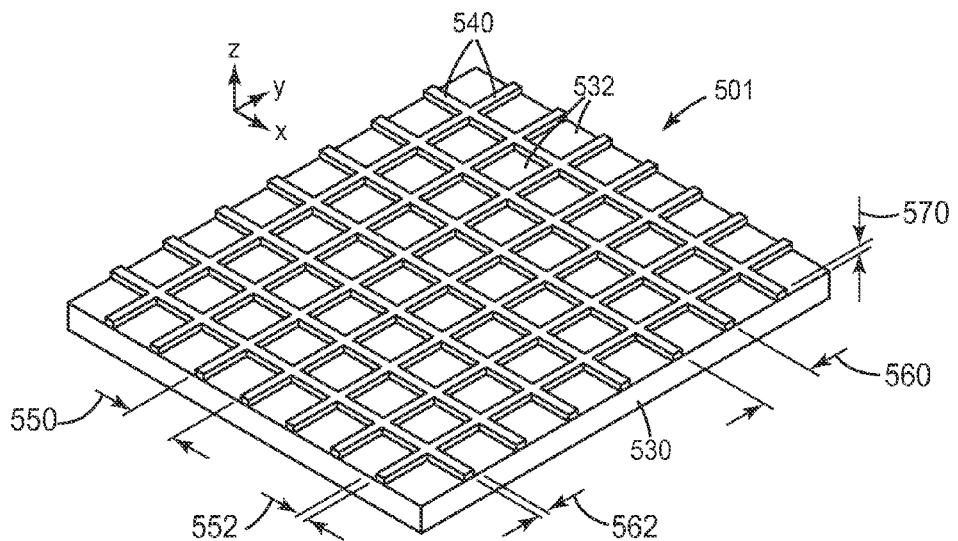
FIG. 5 is a schematic isometric view of a high transparency conductive region of an article such as an antenna.

A representative micropatterned conductive material is shown schematically in FIG. 5. There, an article 501 or portion of an article, such as a portion of an antenna device, has a high transparency conductive region provided by a micropatterned conductor 540 disposed on a substrate 530. The conductor 540 is typically an electrically conductive thin film (e.g., a thin metal film) that has been patterned, shaped, or otherwise formed to define a fine mesh pattern. The mesh pattern can be defined in terms of (1) the width, (2) the density, and (3) uniformity of the density of conductive traces that make up the mesh pattern. Instead of density, an inverse or complementary parameter known as open area fraction can be defined. The open area fraction is simply one minus the area fraction occupied by the conductive traces, expressed as a percentage, over a conductive region of interest. (The area fraction occupied by the conductive traces can also be referred to as the shadowed area fraction.) For purposes of calculating such open area fraction, unless otherwise specified, the region of interest should correspond to a conductive portion of the article rather than a portion containing only "dummy" elements. Furthermore, those skilled in the art will appreciate that the region of interest must be reasonably selected, relative to the scale of the micropattern, so as to make relevant measurements or calculations of the open area fraction or other properties. Such calculations or measurements should ideally be the same as one would calculate for a region of infinite extent having the same micropattern as the region of interest but where the micropattern repeats or otherwise extends over the entire infinite region.

The mesh pattern may be any desired shape, e.g., regular and repeating, or irregular and non-repeating. In the case of a regular repeating pattern, the mesh may have a unit cell (smallest repeating pattern) in the form of a geometric figure, for example a triangle, square, rectangle, diamond, trapezoid, hexagon, heptagon, or the like. In other cases, the mesh may be made up of cells with different shapes including random or pseudo random shapes, as shown for example in FIG. 8 below. Random conductor patterns can be derived from processes that generate random cellular structures by phase separation.

The article 501 of FIG. 5 is shown as possessing a regular repeating square or diamond-shaped micropattern. Places on the substrate 530 that are devoid of conductor 540 constitute open areas 532. The conductor 540 has a thickness 570, and is patterned to have a trace width 552 along the x-direction, and a trace width 562 along the y-direction. The traces have a pitch 550 along the x-direction, and a pitch 560 along the y-direction. In simple isotropic or symmetric embodiments, the widths 552, 562 may be substantially the same, and the pitches 550, 560 may also be substantially the same. In other embodiments that may not be isotropic or symmetric, the trace widths along different in-plane directions may be different, and the trace pitches along different in-plane directions may also be different.

The micropatterned conductor may be formed by any suitable method that can generate the desired geometries. Those methods include photopatterning methods (e.g., photolithography), laser patterning methods (e.g., laser-curing, laser ablation, and laser exposure plus development), and printing methods (e.g., gravure printing, flexographic printing, and microcontact printing). The forming methods for the micropatterned conductor can include an etching or a plating step, for example an electroless plating step, optionally in combination with any of the aforementioned patterning steps. An especially useful method for forming the micropatterned conductors of the disclosed RFID antennas involves the combination of microcontact printing and etching, as described in U.S. Pat. No. 5,512,131 (Kumar et al.) and PCT Publication WO 2009/154812 (Frey et al.). The combination of microcontact printing and etching can be used to form antenna patterns meeting the conditions set forth herein, followed by attachment of suitable electronics, such as one or more integrated circuits, to the high transparency antenna.

Suitable conductive materials include: metals such as silver, gold, palladium, platinum, aluminum, copper, nickel, tin, alloys thereof, and combinations thereof; and composites, such as metal particle-filled polymer inks. Especially preferred conductors are metals.

As already mentioned above, exemplary micropatterned conductors exhibit an open area fraction of more than 80, 90, or 95%, or in a range from 95 to 98%. Exemplary micropatterned conductors also exhibit a thickness of the conductive traces in a range from 20 nanometers to 10 micrometers, or less than 2 microns, or less than 1 micron, or in a range from 30 nanometers to 1 micron. Preferably, the transverse width of the conductive traces is in a range from 0.1 to 20 micrometers, or from 0.5 to 20 microns, or from 0.5 to 10 microns, or from 1 to 5 micrometers, or from 1.5 to 4 micrometers, or less than 20, 10, 6, 5, 4, 3, 2, or 1 micron. Preferably, the trace-to-trace pitch of the micropattern is less than 300 micrometers.

A chief optical characteristic of the micropatterned conductors is the open area fraction of the micropattern, which has already been discussed. Other significant optical characteristics include the visible light transmittance and haze of the conductive portion(s) of the micropatterned article, as well as the conductive trace visibility. In exemplary embodiments, the haze value of the conductive region of the disclosed articles is less than 10, 5, or 2%. The haze of a given article or conductive portion thereof may be measured, for example, using a Haze-Gard Plus instrument available from BYK-Gardner, Columbia, Md. Also in exemplary embodiments, the conductive region of the disclosed articles, for example an antenna comprising an insulating substrate and a conductive micropattern, has a visible light transmission value in the conductive region of the micropattern of greater than 50, 60, 70, 80, or 90%, or in the range of 80 to 90%.

A chief electrical property of the micropatterned conductors is the sheet resistance of the conductive portion of the article. In exemplary embodiments, the sheet resistance along any given in-plane direction is in a range of 0.1 to 200 ohms per square, in a range of 1 to 100 ohms per square, or no more than 50, 20, 10, 5, 1, or even 0.1 ohms per square.

Figure 6A:
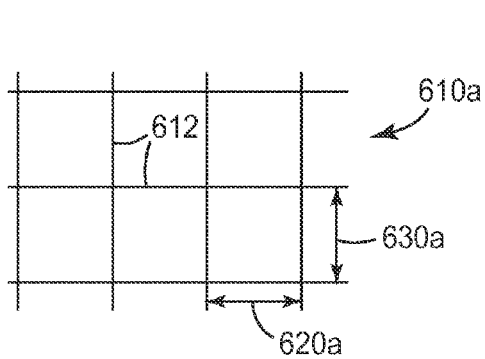
FIG. 6a is a schematic front or top view of a high transparency conductive region having a square or rectangular micropattern.

Turning now to FIG. 6a, we see there a schematic front or top view of a high transparency conductive region 610a having a square or rectangular micropattern formed by traces 612. The pattern of FIG. 6a is similar to that of FIG. 5, but the transverse width of the traces 612, as a fraction of the pitch of the traces, is less than that depicted in FIG. 5. The pitch of the traces in FIG. 6a is labeled as 620a along one in-plane axis, and 630a along an orthogonal in-plane axis. These pitches may be the same or different, depending on the desired properties of the conductive region 610a. The transverse width of the traces likewise may be the same or different along orthogonal in-plane axes (for different traces forming the pattern), depending on the desired properties of the conductive region 610a.

Figure 6B:
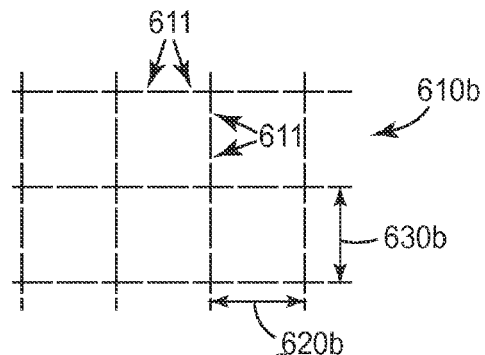
FIG. 6b is a schematic front or top view of a high transparency non-conductive region having the same nominal micropattern as that of FIG. 6a, but utilizing a "broken mesh"

FIG. 6b is a schematic front or top view of a high transparency non-conductive region 610b. Region 610b has the same nominal micropattern as that of FIG. 6a, except that selective breaks 611 are included so that the region 610b is not electrically conductive. The traces that form the pattern of FIG. 6b may be the same as or similar to those that form the pattern of FIG. 6a, e.g., they may be composed of the same or similar thin layer of metal or other conductive material as in the embodiment of FIG. 6a, except that the selective breaks 611 prevent the flow of electricity along the broken mesh micropattern of FIG. 6b. The breaks are preferably relatively short, for example less than 30, 20, 10, or even 2 micrometers.

By making the breaks short relative to the pattern pitch, and by having a small number of breaks (e.g., less than 10) within each unit cell of the pattern, the non-conductive region 610b containing the broken micropattern can be made to have an appearance to the ordinary observer or the user of the article that is the same or nearly the same as the conductive region 610a. Such similarity in appearance can be used advantageously to conceal an RFID antenna that is formed using conductive regions such as the conductive region 610a and non-conductive regions such as the non-conductive region 610b. Thus, even if the conductive region 610a has an open area fraction of at least 90 or 95%, such that the presence of the traces 612 reduces the visible light transmission of the article in those places by only 5 or 10%, for example, an observer may still be able to notice the antenna as a result of the geometrical layout of the antenna in combination with the 5 or 10% difference in visible light transmission of that layout relative to neighboring portions of the article, if non-conductive portions of the article are provided with no traces of conductive material at all. On the other hand, by providing a broken trace pattern such as that of FIG. 6b in the non-conductive portions of the article that neighbor the conductive portions making up the antenna, the visible light transmission of the neighboring portions can be made to nearly match, and the difference in visible light transmission (or contrast) between the neighboring portions can be greatly reduced, thus making the antenna much less noticeable and less apparent to users or ordinary observers.

Figure 7A:
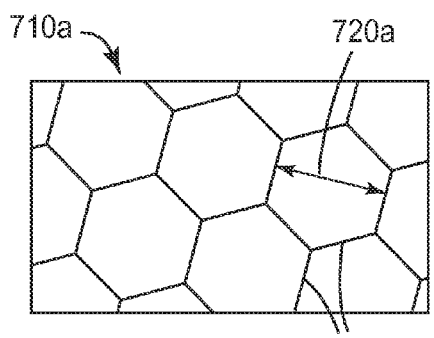
FIG. 7a is a schematic front or top view of a high transparency conductive region having a hexagonal micropattern.

FIG. 7a is a schematic front or top view of another high transparency conductive region 710a. Region 710a utilizes traces 712 of conductive material that are arranged to form a hexagonal micropattern rather than a square micropattern. Pairs of opposed sides (traces) of the hexagonal unit cell define three in-plane axes along with a trace pitch can be defined, one of which is labeled 720a in FIG. 7a. For a regular equilateral hexagon shape, the pitches along the three axes can all be the same, but if elongated or distorted hexagon shapes are used, the pitches along the different in-plane axes may be different.

The exemplary values and ranges discussed elsewhere herein for open area fraction, conductor trace thickness, conductor trace transverse width, conductor trace pitch, visible light transmittance, haze, and sheet resistance are equally applicable to the conductive region 710a of FIG. 7a.

Figure 7B:
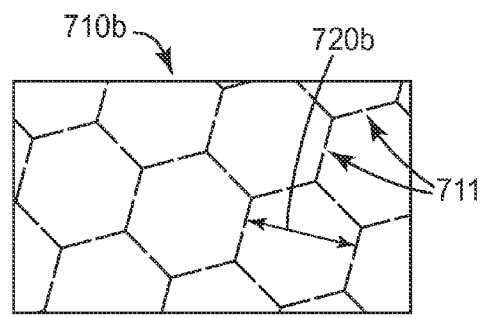
FIG. 7b is a schematic front or top view of a high transparency non-conductive region having the same nominal micropattern as that of FIG. 7a, but utilizing a "broken mesh"

FIG. 7b is a schematic front or top view of a high transparency non-conductive region 710b. Region 710b has the same nominal micropattern as that of FIG. 7a, except that selective breaks 711 are included so that the region 710b is not electrically conductive. The traces that form the pattern of FIG. 7b may be the same or similar to those that form the pattern of FIG. 7a, e.g., they may be composed of the same or similar thin layer of metal or other conductive material as in the embodiment of FIG. 7a, except that the selective breaks 711 prevent the flow of electricity along the broken micropattern of FIG. 7b. The breaks are preferably relatively short, for example less than 30, 20, 10, or even 2 micrometers, and a sufficiently small number of them (e.g. less than 10) are included in each hexagonal unit cell so that the visual appearance of region 710b can be made the same or nearly the same as the visual appearance of the conductive region 710a. The similarity in visual appearance can be used beneficially to conceal an RF antenna when the regions 710a, 710b occupy neighboring (e.g. complementary) areas on an RF device.

Figure 7C:
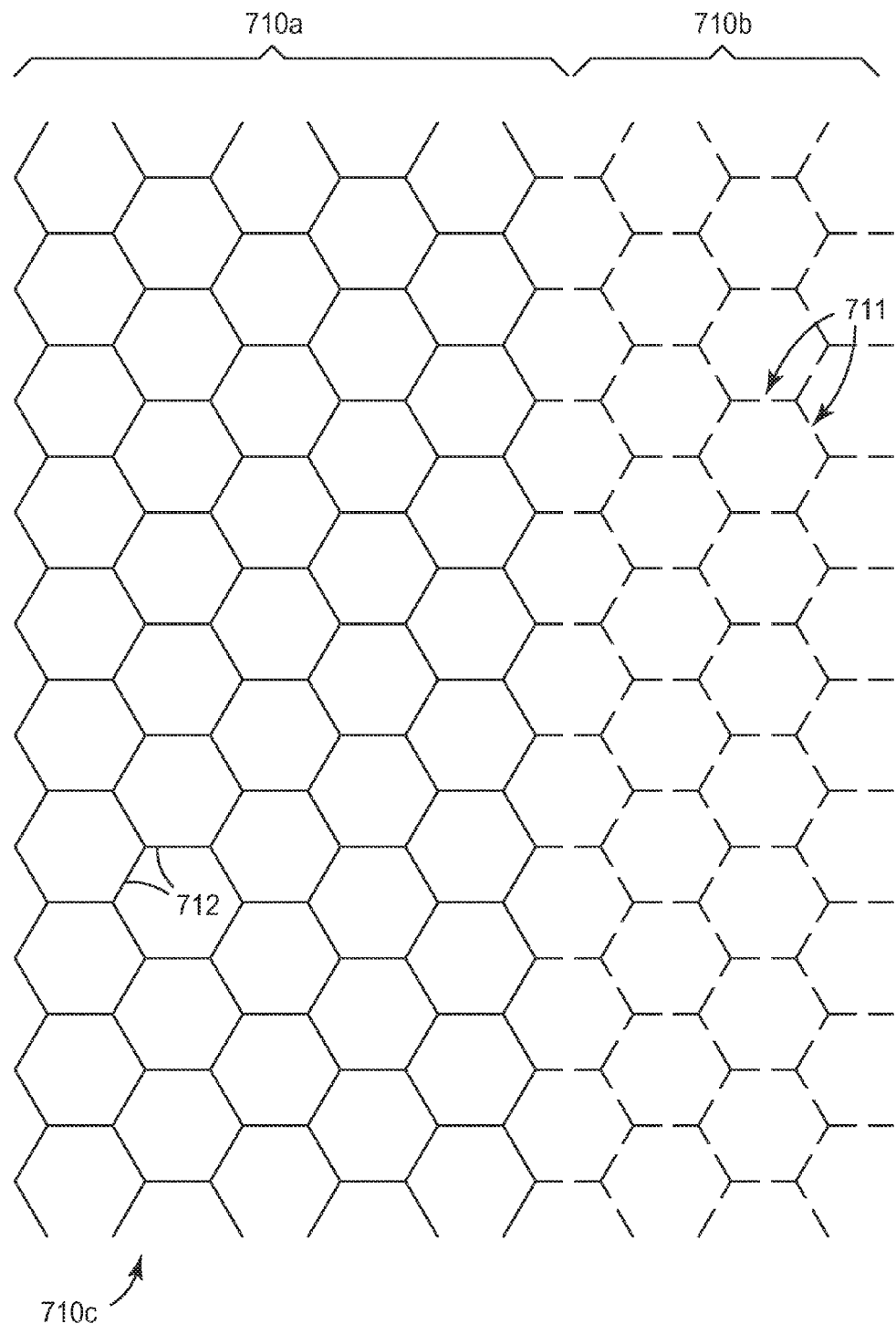
FIG. 7c is a schematic front or top view of an article having a high transparency conductive region and a high transparency non-conductive region, the regions having the same nominal micropattern.

FIG. 7c is a schematic front or top view of an article 710c such as an RFID antenna device that incorporates a high transparency conductive region 710a, e.g. as part of a dipole antenna or other antenna, and a neighboring high transparency non-conductive region 710b. The regions 710a, 710b have the same nominal hexagonal micropattern, formed from traces 712 of conductive material, but breaks 711 are provided in region 710b to render that region non-conductive. The boundary between region 710a and 710b may represent the boundary between a conductive portion and non-conductive portion of any of the antenna devices disclosed herein, e.g., any of the antenna devices described in connection with FIG. 3 or 4a-e.

Figure 8:
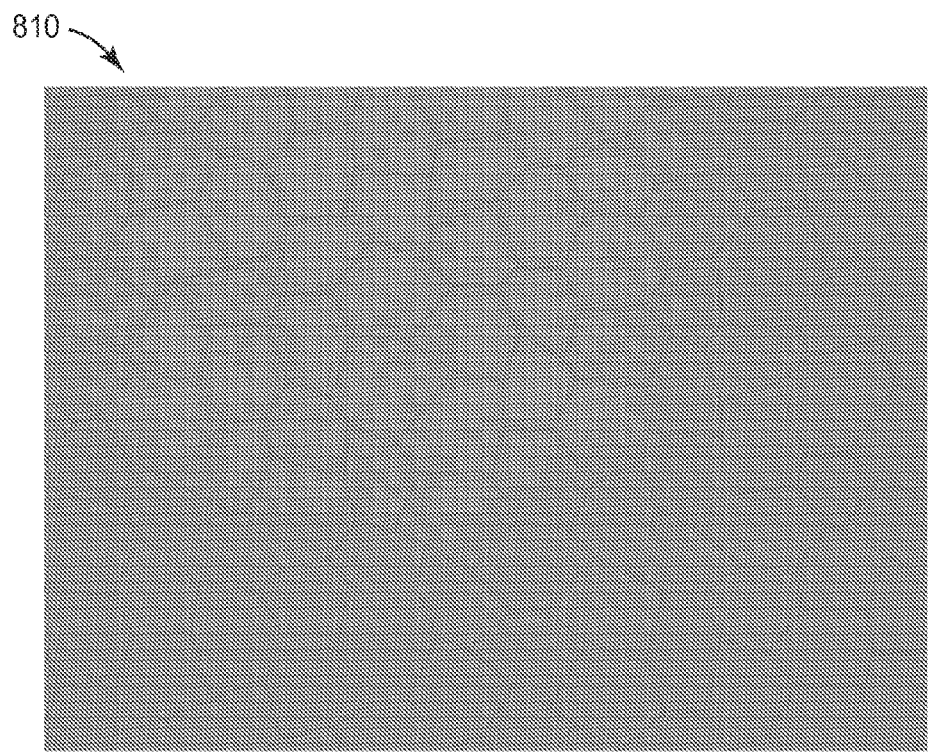
FIG. 8 is a photomicrograph of a high transparency conductive region having a pseudo-random mesh micropattern.

FIG. 8 is a photomicrograph of a high transparency conductive region 810 having a pseudo-random mesh micropattern. Random, pseudo-random, and irregular patterns may be used for the micropatterned conductor in the disclosed RFID antenna devices rather than regular repeating patterns. Irregular patterns and the like may be used to reduce unwanted Moire patterns in cases where the RFID antenna is adhered to or otherwise combined with another component that contains visible lines, cells, or other features.

Figure 9:
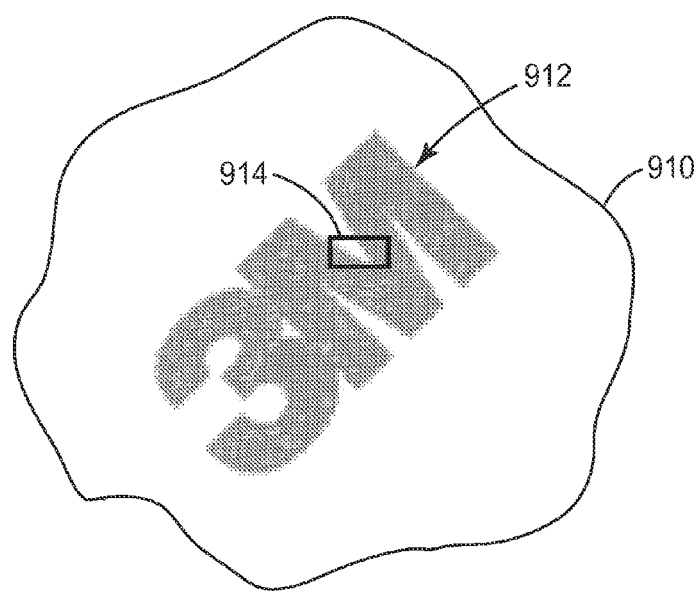
FIG. 9 is a schematic front or top view of a conductive region that incorporates a detectable image.

In some cases it may be desirable to incorporate one or more indicia or other images into the high transparency conductive region, where the indicia may be highly visible or noticeable to the user, or alternatively the indicia may be only minimally visible. In some cases the indicia may be covert, i.e., not easily visible or apparent to the unaided human eye, but detectable under specialized conditions such as under magnification, under specific wavelength(s) of illumination, and/or under specific angles of illumination and/or viewing. In some cases, the indicia may be less visible, or even invisible, when viewed with illumination primarily passing through the antenna (for example incident on the antenna from the back side, relative to the viewer) and may be visible or substantially more visible when viewed with a illumination that is primarily incident on the antenna from substantially the same side of the antenna as the viewer (for example, incident on the antenna at an angle of less than 90 degrees from the observation direction of the viewer); in such embodiments, the material comprising the conductor pattern is preferably reflective. An exemplary indicia 912, which may be covert or highly visible, is depicted schematically in FIG. 9 in the context of a conductive region 910. The indicia may take the form of a brand insignia or security insignia, or other shape or shapes as desired. The indicia may be incorporated into the mesh design itself, and/or additional micropattern features may be added to the original pattern of conductive traces (of the micropatterned conductor) to provide a unique visual feature for the antenna layer or conductive region. The shape or pattern of the additional micropattern features may have little or no effect on the functional aspects of the antenna pattern, e.g., little or no effect on the sheet resistance of the conductive region.

Figure 9A:
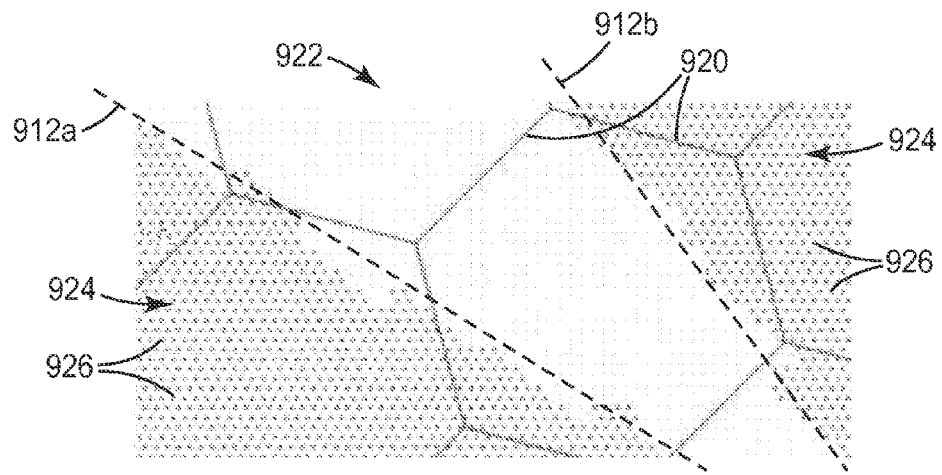
FIGS. 9a, 9b, and 9c are schematic enlarged front or top views of the region 914 in FIG. 9, the different figures illustrating some different techniques for forming the detectable image.
Figure 9B:
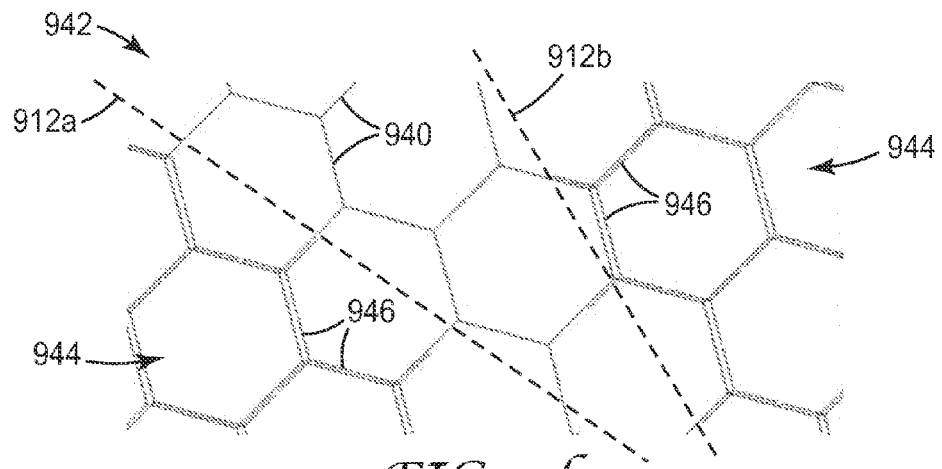
Figure 9C:
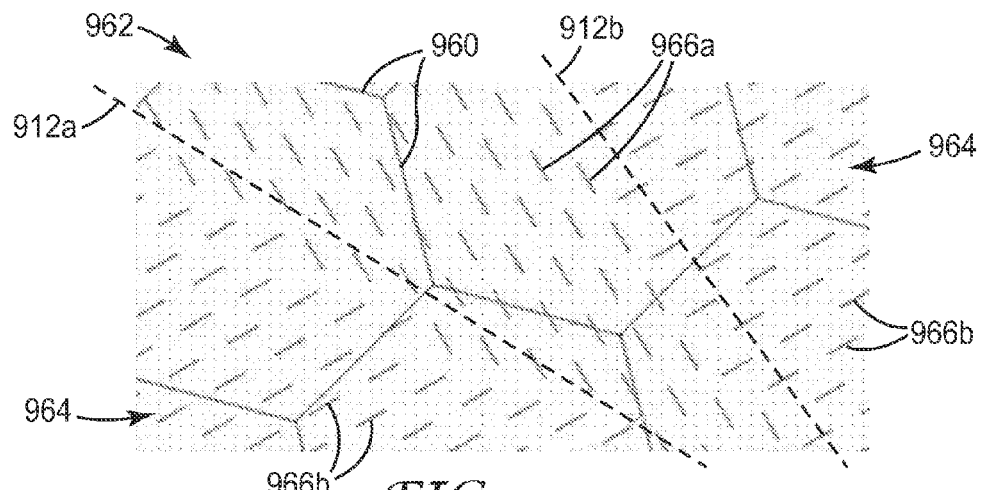

Examples of additional micropattern features include dot arrays and line arrays that reflect or diffract light, wherein the array(s) define the shape of the indicia. Other examples of additional micropattern features include line elements with an orientation that differs from the orientation of line elements that make up the functional antenna portion of the conductor pattern. In some cases involving additional micropattern features, the conductive elements may desirably be reflective. FIGS. 9a through 9c provide some examples of additional micropattern features that may be used to provide an indicia such as that of FIG. 9. For comparison purposes and ease of discussion, each of FIGS. 9a through 9c is depicted as representing the area 914 in FIG. 9, which includes portions of the indicia 912 and also a background portion representing the original or unmodified micropatterned conductive region.

In FIG. 9a, traces 920 of conductive material arranged in a hexagonal pattern provide a high transparency conductive region. Additional micropattern features 926, in this case, a pattern of isolated dots, are also provided on or in the substrate to distinguish indicia portions 924 from background portions 922 of the conductive region. Phantom guidelines 912a, 912b are drawn to depict boundaries between the indicia portions and background portions, the guidelines forming part of the "M" in the indicia shown in FIG. 9. The micropattern features 926 may be made of the same conductive film or material that forms the traces 920 of the micropatterned conductor, or they may be made of a different material, e.g., any other suitable conductor or other suitable material, including electrically non-conductive or insulating materials. The micropattern features 926 may be small enough to diffract light in the indicia portions. In an illustrative embodiment, the features 926 may be squares of dimension 3×3 microns, the squares arranged in a hexagonal array with 10.2 micron center-to-center spacing of adjacent squares.

In FIG. 9b, traces 940 of conductive material arranged in a hexagonal pattern provide a high transparency conductive region. Additional micropattern features 946, in this case, a pattern of line segments arranged close to traces 940, are also provided on or in the substrate to distinguish indicia portions 944 from background portions 942 of the conductive region. Phantom guidelines 912a, 912b are drawn to depict boundaries between the indicia portions and background portions, the guidelines forming part of the "M" in the indicia shown in FIG. 9. The micropattern features 946 may be made of the same conductive film or material that forms the traces 940 of the micropatterned conductor, or they may be made of a different material, e.g., any other suitable conductor or other suitable material, including electrically non-conductive or insulating materials.

In FIG. 9c, traces 960 of conductive material arranged in a hexagonal pattern provide a high transparency conductive region. Additional micropattern features 966a, 966b in this case, sets of differently oriented isolated line segments, are also provided on or in the substrate to distinguish indicia portions 964 from background portions 962 of the conductive region. Phantom guidelines 912a, 912b are drawn to depict boundaries between the indicia portions and background portions, the phantom lines forming part of the "M" in the indicia shown in FIG. 9. One or both sets of micropattern features 966a, 966b may be made of the same conductive film or material that forms the traces 960 of the micropatterned conductor, or one or both sets may be made of a different material, e.g., any other suitable conductor or other suitable material, including electrically non-conductive or insulating materials.

Figure 10:
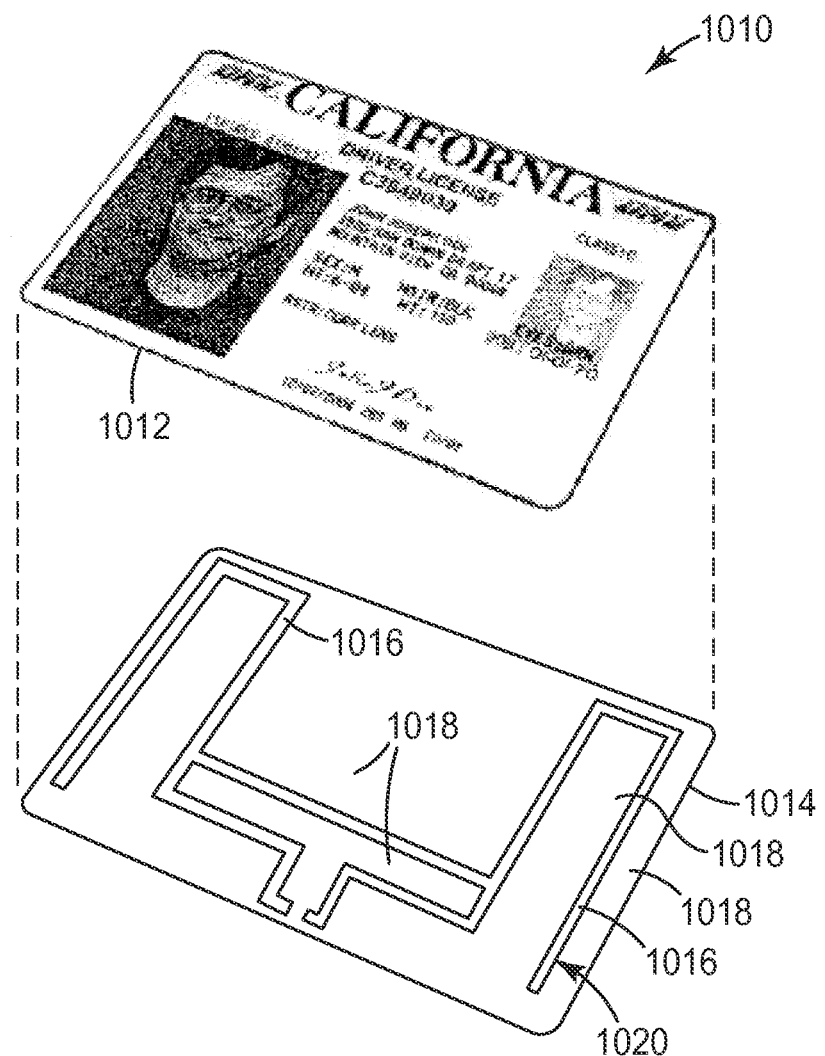
FIG. 10 is a schematic isometric exploded view of a card or similar article incorporating an RFID device having a UHF antenna.

FIG. 10 is a schematic isometric exploded view of a card or similar article 1010 that incorporates an RFID device having a UHF antenna 1020. The article includes a first layer or portion 1012 which is laminated or otherwise adhered to a second layer or portion 1014. The first layer may include elements or features that are appropriate for the intended use of the article, e.g., photographic information, alphanumeric information, embossed features, and security features. In the depicted embodiment, the article 1010 represents a person's driver's license, but in other cases it may be or include another article such as a financial transaction cards (including credit and debit cards), identification card, payment card, or the like. The second layer 1014 includes an insulating substrate or film on or in which a high transparency conductive region 1016 is formed amidst non-conductive regions 1018, the conductive region shaped to form the antenna 1020. The conductive region 1016 is provided with any of the high transparency micropatterned conductors described elsewhere herein. In order to provide enhanced reliability and durability during the card fabrication process and during use, the micropatterned conductor preferably uses a metallic conductive material rather than a metal oxide conductive materials such as indium tin oxide (ITO). The article 1010 is also adapted to include a small RFID integrated circuit (not shown) coupled to the antenna 1020 to communicate with an RFID reader.

The card may include other structures, components or materials that are known in the field of identification and transaction cards, and which may impart security, communication, or graphic features or functions. In exemplary embodiments, the non-conductive regions 1018 include a broken micropattern (see e.g. FIGS. 6b, 7b, 7c) to decrease the contrast between regions 1016, 1018 and thus reduce the visibility of antenna 1020, particular in cases where the card as a whole is designed to be light transmissive. Some light-transmissive cards are known to include a near infrared filter that has a high transmission of visible light but absorbs, reflects, or otherwise blocks light over a band of near infrared wavelengths so that the card is able to block light from an infrared LED or similar light source used in automatic teller machines (ATMs) to detect the presence of the card. In such cases, as mentioned previously above, the antenna may be disposed directly on the infrared-blocking film. The infrared-blocking film may be or comprise a multilayer optical film composed of alternating polymer layers whose refractive indices and thicknesses are tailored to provide a high transmission for normally incident visible light but to substantially block near infrared light. The layer 1014 with the applied antenna 1020 can be laminated with other materials to form the card, or to form other desired articles, by methods that are known in the field.

In some cases, a device in the form of an RFID tag includes an integrated circuit and an antenna, wherein the antenna comprises a metallic conductive mesh micropattern having a metal thickness in the range of about 30 nanometers to about 1 micron, traces of width in the range of 0.5 to 10 microns, open area fraction of at least 90%, and an effective sheet resistance in the range of 1 to 200 ohms per square. Furthermore, a card as described elsewhere herein may include the aforementioned tag, the card optionally being transparent. Also, an RFID system may comprise the aforementioned tag, along with a reader operating at between 0.2 Watt and 5 Watts radiated power at a frequency or frequencies between 860 MHz and 960 MHz, wherein the antenna is tailored such that the maximum distance at which the RFID reader can communicate with the device is in a range from 1 centimeter to 2 meters.

In some cases, a device in the form of an RFID tag includes an integrated circuit and an antenna, wherein the antenna comprises a metallic conductive mesh micropattern having a metal thickness in the range of about 30 nanometers to about 1 micron, traces of width in the range of 1 to 5 microns, open area fraction of at least 95%, and an effective sheet resistance in the range of 1 to 100 ohms per square. Furthermore, a card as described elsewhere herein may include the aforementioned tag, the card optionally being transparent. Also, an RFID system may comprise the aforementioned tag, along with a reader operating at between 0.2 Watt and 5 Watts radiated power at a frequency or frequencies between 860 MHz and 960 MHz, wherein the antenna is tailored so that the maximum distance at which the RFID reader can communicate with the device is in a range from 1 centimeter to 2 meters.

In some cases, a device in the form of an RFID tag includes an integrated circuit and an antenna, wherein the antenna comprises metallic conductive mesh micropattern having metal thickness in the range of about 30 nanometers to about 1 micron, traces of width in the range of 1 to 5 microns, open area fraction in the range of 95% to 98%, and an effective sheet resistance in the range of 1 to 100 ohms per square. Furthermore, a card as described elsewhere herein may include the aforementioned tag, the card optionally being transparent. Also, an RFID system may comprise the aforementioned tag, along with a reader operating at between 0.2 Watt and 5 Watts radiated power at a frequency or frequencies between 860 MHz and 960 MHz, wherein the antenna is tailored so that the maximum distance at which the RFID reader can communicate with the device is in a range from 1 centimeter to 2 meters.

EXAMPLES

Several RFID antenna devices were fabricated using the high transparency micropaterned conductors discussed herein, and tested.

Example 1 and Comparative Example 1

For Example 1, a transparent slot antenna of the type depicted in FIG. 3 was fabricated using a high transparency micropatterned conductor. The outer boundary of the conductive region was 15 cm×15 cm. The inner boundary of the conductive region, i.e., the non-conductive slot region 312*a* in the center of the antenna, was 5 cm×0.5 cm. The patterned conductor was made of a thin film of silver metal, deposited on a substrate of transparent poly(ethyleneterephthalate) (PET, product code ST504, 125 micrometers thick, E. I. DuPont de Nemours and Company, Wilmington Del.) and patterned according to the microcontact printing methods described in PCT Publication WO 2009/154812 (Frey et al.). The design of the micropattern, i.e., the mesh geometry, utilized randomly shaped cells, a photomicrograph of which (taken in transmission) is shown in FIG. 8. The average cell size (transverse dimension or pitch) was about 200 micrometers. The trace width for all traces was about 1.5 micrometers. The thickness of the silver metal was about 100 nanometers. The open area fraction of the conductive region was about 98.5%. The sheet resistance of the conductive region was measured to be about 30 to 40 ohms per square. Two copper tape tabs were adhered to the conductive region on each side of the central slot, as shown in FIG. 3, with conductive adhesive. A coaxial cable was obtained and cut on one end to expose the signal and ground conductors, and solder was used to attach these conductors to the copper tabs.

As a benchmark (Comparative Example 1), a similarly sized opaque antenna structure was fabricated using an adhesive-backed continuous (not micropatterned) copper sheet. The copper sheet was cut to form a square 15 cm×15 cm in size. A slot, 5 cm×0.5 cm in size, was cut from the center of the square to produce the antenna shape shown in FIG. 3. This adhesive-backed copper sheet was mounted to a 15 cm×15 cm foam core board. The foam core provided a stiff backing for the copper sheeting, but did not interfere with its electromagnetic properties. A coaxial cable was obtained and attached via its signal and ground conductors to the copper conductor on opposite sides of the slot, in the same fashion as the antenna of Example 1.

The antennas of Example 1 and Comparative Example 1 were evaluated by analyzing their electrical transmission characteristics. The principle behind the measurement technique is best illustrated by reference to the Friis Equation:

$$P_r = \left(\frac{|F|^2}{4\pi r^2}\right) e_t D_t P_t [1 - |\Gamma_t|^2][1 - |\Gamma_r|^2] p \left[\frac{\lambda^2}{4\pi} e_r D_r\right]$$

where:
$D_t$, $D_r$=antenna directivities
$e_r$, $e_t$=antenna efficiencies (based on materials)
$F=E_{actual}/E_{free\ space}$
$\Gamma_t$, $\Gamma_r$=antenna reflection coefficients
p=polarization mismatch loss
$P_t$=transmit power
$P_r$=received power
r=distance between antennas There are many factors that determine received power. In this measurement, however, since the Example 1 and Comparative Example 1 antennas were designed to have identical overall geometries, we assume that all of the variables can be held constant except for the efficiency, which is based on material parameters.

The antenna under test (Example 1 or Comparative Example 1) was connected to port 1 of a network analyzer, and a standard 2.45 GHz patch antenna was connected to port 2 of the analyzer. The distance between the antenna under test and the patch antenna was held constant at 32 cm. The resulting measured antenna transmission values were as follows: Example 1 antenna, −31.5 dB; Comparative Example 1 antenna, −28.8 dB; cable alone (disconnected from Example 1 antenna), −50 dB. More positive values (smaller negative values) indicate more transmission. We did not optimize antenna impedance, hence, the absolute number is less important than the difference in measurement between the Example 1 and Comparative Example 1 antennas. The drop of about 3 dB in performance indicates that the Example 1 transparent micropatterned conductor has about half the efficiency as the Comparative Example 1 opaque copper sheet at 2.45 GHz. The cable alone measurement was done to confirm that the copper tabs and cable functioned as a poor antenna, verifying that the measured transmission for the Example 1 antenna is due to the micropatterned conductor and not the cable/copper tabs.

Examples 2-45

RFID antennas were fabricated using high transparency micropatterned conductors. A variety of antenna designs were used, including antennas adapted for use at 13.56 MHz and antennas adapted for use at 915 MHz. Different micropatterned conductors were also used, the differences including differences in trace width, trace pitch, trace thickness, and open area fraction. For each RFID antenna, the DC resistance of the antenna was measured with a digital multimeter (Fluke 73III Multimeter, Fluke Corporation, USA), and an RFID integrated circuit was then connected to the antenna. The RFID device so fabricated was then evaluated with a conventional RFID reader to determine if a signal could be observed when the RFID device was positioned directly against the RFID reader. If a signal was observed, the distance between the RFID reader and RFID device was then progressively increased until a signal was no longer observed, that distance being recorded as the value Dmax discussed above in connection with FIG. 1.

Antenna Fabrication Method

Antennas were each fabricated by patterning a thin film deposit of silver on a polymer film substrate, according to the methods described in U.S. Patent Application Ser. No. 61/220,407, "Methods of Wet Etching a Self-assembled Monolayer Patterned Substrate and Metal Patterned Articles", filed 25 Jun. 2009. The methods included deposition of a thin layer of silver onto a 125 micrometer thick poly(ethyleneterephthalate) (PET) polymer film substrate (ST504, E. I. DuPont de Nemours and Company, Wilmington, Del.). Different methods were used to deposit the silver layer for different thicknesses. For antennas derived from a silver layer of 30, 300, 500, 700, or 1000 nanometer thickness, the silver was deposited by e-beam evaporation on the PET substrate after first evaporating an adhesion promotion layer of titanium with average thickness of 0.5 nanometers. For antennas derived from a silver layer of 60 or 100 nanometer thickness, silver was deposited by sputtering on the PET substrate. A pattern of octadecylthiol self-assembled monolayer was deposited onto the silver surface by microcontact printing, and then the silver layer was selectively etched from the unprinted regions, both according to the methods described in U.S. Patent Application Ser. No. 61/220,407, "Methods of Wet Etching a Self-assembled Monolayer Patterned Substrate and Metal Patterned Articles", filed 25 Jun. 2009.

RFID Tag Assembly Methods

For each RFID tag, an integrated circuit die was bonded to an antenna fabricated as described above. For each UHF tag listed below (i.e., Examples 6 through 45), the die was a NXP G2XM UHF RFID die, available from NXP Semiconductors, San Jose, Calif. This G2XM die was mounted to a metal lead frame on polymer substrate conforming to the JEDEC MO-283-B standard outline for RFID carrier tape (refer to the website at http://www.jedec.org/committees/jc-65). The large end pads of the MO-283-B carrier tape are designed for connection to corresponding pads on the antenna. The MO-283-B carrier tape is designed to be used in a continuous roll form in automated circuit assembly operations. For the samples prepared for this study, individual carriers, each comprising a single G2XM die attached to the metal lead frame on polymer carrier, were cut from a larger supply roll.

For these samples, the metal pads of the MO-283-B carrier were electrically and physically connected to the corresponding attach pads on the antenna structure with Anisotropic Conductive Paste (ACP) adhesive. The ACP was Loctite® 3447 Snap Cure Anisotropic Conductive Adhesive paste available from Henkel Loctite, Research Development, & Engineering, Tallaght Business Park, Dublin, Ireland. The ACP adhesive comprises a heat-curable monocomponent epoxy vehicle with 0.005 mm diameter nickel spheres distributed throughout the volume of the epoxy. The density of the nickel spheres is low enough so that when the epoxy is cured, connections may be made by compressing the vertical dimension ("Z axis") of the film. The areal density of particles is low enough that there is no significant lateral (x-y) conductivity in the compressed ACP adhesive layer.

To bond the MO-283-B carrier to the UHF antenna, the following process was used.

(Bonding Step 1) ACP adhesive was applied to the attach pads on the antenna. The total amount of paste needed for this process is approximately the areal size of the attach pad (3 mm×3 mm) in a layer approximately 0.025 mm thick, or 0.225 mm$^3$ (0.225×10$^{-3}$ milliliters). In practice it is difficult to dispense a small volume by hand; excess ACP adhesive tended to squeeze out around the edge of the pads during the bonding process.

(Bonding Step 2) The MO-283-B carrier was placed on the uncured adhesive with the large metal attach pads aligned to the antenna attach pads. The surface tension of the uncured adhesive temporarily held the MO-283-B carrier in alignment.

(Bonding Step 3) With the MO-283-B carrier aligned to the antenna attach pads and tacked by the uncured epoxy, the in-process tag was moved to the bonding stage of a Mühlbauer TTS300 Manual Bonder (Mühlbauer AG High Tech International, Roding, Germany).

(Bonding Step 4) The TTS300 is designed for Flip Chip die attach processes, where a small (<2 mm square) silicon die is bonded to a circuit. Because the attach pads on the MO-283-B carrier tape and on the antenna are large—approximately 3 mm square—and widely separated, one end of the carrier was bonded to its corresponding antenna attach pad at a time. This required repeating the bonding process two times for each carrier, once for each end. The other reason to bond the carrier to the antenna in two operations was to avoid putting any pressure or heat on the silicon die in the middle of the carrier. The silicon die is susceptible to physical damage, and the stress imposed by the thermodes could cause it to crack or fail. In addition, the silicon die would tend to hold the thermodes apart, preventing them from applying pressure to the attach pads at the ends of the carrier tape.

(Bonding Step 5) The TTS300 Manual Bonder is designed to apply programmable values of pressure and heat to electrically connect and to cure the ACP adhesive. Two thermodes, one above and one below, capture the connection pads and ACP adhesive. The thermodes apply pressure to engage the nickel particles to form an electrical connection between the two metal surfaces. The heat flowing from the thermode into the bond area cures the epoxy matrix and seals the connection in place.

(Bonding Step 6) The thermodes are released and the finished sample is removed from the Manual Bonder.

The bonding conditions specified by the adhesive manufacturer (Henkel Loctite) for bonding bumped silicon die to RFID antennas are 100 grams (0.98 Newtons) force per bump (bump size typically 0.080 mm square or circle), at a temperature of 170° C. to 190° C. at the bond line, within 3 to 5 seconds of the first application of pressure and heat. Depending on the heat dissipation in the metal connection pads and substrates, the thermodes will typically need to supply 190° C. to 210° C. to reach the specified bondline temperature within the specified time limit.

The attach pads for the MO-283-B package are approximately 3 mm square, so the thermodes were operated near their upper limit of 8 Newtons force. Under these conditions, the force per unit area was sufficient to electrically connect the attach pads of the carrier tape to the attach pads of the antenna through the conductive particles of the ACP adhesive.

For each HF tag listed below (i.e., Examples 2 through 5), the RFID integrated circuit die was NXP I-Code SLI on a metal on polymer lead frame. The lead frame is similar to the JEDEC MO-283-B in materials and construction. The HF die lead frame differs in the form factor. In this case the metal form was approximately 15 mm long. The die was connected in the center to approximately 1 mm wide traces. The traces terminated in 3 mm square pads at the end of the traces, with the net effect looking similar to a dog bone.

Other than the different form factor for the metal on polymer carrier, the bonding process for the HF die on lead frame was similar to the bonding process for the G2XM UHF die on MO-283-B carrier.

RFID Tag Evaluation Methods

RFID tags were evaluated in terms of the distance at which they could be read, using specified conditions.

For the HF tags (Examples 2 through 5), the RFID function was checked using a Texas Instruments TRF7960EVM reader using the built-in reader antenna supplied with the module (Texas Instruments, Dallas, Tex.; TRF7960EVM available from Digi-Key, Thief River Falls, Minn.).

The TRF7960EVM was connected to the USB terminal of a laboratory computer. The USB terminal provided electrical power to the module and communicated with it using the program supplied with the TRF7960EVM. The TRF7960EVM has on-board LED displays that light up when the reader detects an RFID tag response. In this nominal operating mode, the TRF7960EVM operates in the RFID ISM band at 13.56 MHz, with 200 mWatts emitted RF power.

To test the tags made according to this specification, the TRF7960EVM was plugged into the USB port of the laboratory computer. Reader operation was tested using known-good RFID tags to verify that the "tag response" LED indicators were operating, and to verify the approximate read range for a 50 mm square HF antenna design. The read range of the tag under test is the maximum distance at which RFID response from the tag is detected by the reader, i.e., the parameter Dmax discussed above. The distance is measured from the center of the tag to the center of the reader antenna, with the area vector (vector normal to the plane of the antenna) of the reader antenna parallel and concentric with the area vector of the tag antenna. All HF tag read range measurements were made with the tag in free space above the TRF7960EVM antenna. The TRF7960EVM was placed on a nonconductive mineral composite laboratory countertop.

After the TRF7960EVM was confirmed to be functioning, the samples made according to this specification (Examples 2 through 5) were tested. As noted in the results of Table 1 below, where entries "NR" in the column Dmax refer to "no response" from the RFID reader even when the RFID device was placed directly against the reader, the HF mesh antenna designs did not show any response to the TRF7960EVM RFID reader.

To test the UHF tags (Examples 6 through 45), a SAMSys MP9320 2.8 "EPC" reader and Cushcraft 9028PC antenna were used (SAMSys Technologies, now part of Sirit, Toronto, Ontario; Cushcraft Corporation, Manchester, N.H.). The MP 9320 reader was set to a nominal RF power output of 1 Watt. The MP 9320 produces an audible sound when it detects an RFID tag in range of its antenna and responding to its RFID signal. The MP 9320 reader operated in the frequency hopping mode in the 902-928 MHz UHF band specified by the United States FCC for UHF RFID systems.

There are several UHF bands that are designated for RFID system operation, notably 868 MHz in the European Union countries and 956 MHz in Japan. Several other UHF bands are in use in various countries around the world. As with the frequency, the operating power limits allowed by each jurisdiction vary widely around the world. For the purpose of these examples, the United States specifications for operating frequency band and maximum power were used to measure tag response.

The UHF tags (Examples 6 through 45) were tested in a similar manner to the HF tags. The tags were aligned so that the area vectors of the tag antenna and reader antenna were parallel and concentric. If a signal was observed when the tag was placed directly against the RFID reader, the tag was then moved away from the reader antenna along the centerline of the reader antenna. The read range (i.e., Dmax) was determined to be the maximum distance between the center of the reader antenna and the tag antenna at which the reader still detected the RFID tag. The measurement of Dmax was performed in an anechoic chamber, i.e., a chamber specifically designed to make sensitive RF measurements under conditions of low RF noise and low RF reflection.

HF Antenna Designs

Three different antenna designs were tested for operation in the HF range. The pertinent geometries of these three designs are depicted in FIGS. 4a, 4b, and 4c. The design of FIG. 4a (Example 2) was dimensioned to have overall horizontal and vertical dimensions of about 51.3 mm. The design of FIG. 4b (Example 3) was dimensioned to have overall horizontal (long axis) and vertical (short axis) dimensions of about 76.27 and 22.65 mm, respectively. The design of FIG. 4c (Examples 4 and 5) was dimensioned to have overall horizontal (long axis, loop geometry only; i.e., not including pad 434a) and vertical (short axis) dimensions of about 25.57 and 6.73 mm, respectively. In each case, the respective micro-patterned conductor (discussed further below) was unbroken in the conductive areas of the design (e.g. areas 414, 414a, and 414b of FIG. 4a) but broken in the non-conductive areas of the design (e.g., areas 412a, 412b, and the spiral-shaped non-conductive area of FIG. 4a).

UHF Antenna Designs

Two different antenna designs were tested for operation in the UHF range. The pertinent geometries of these two designs are depicted in FIGS. 4d and 4e. The design of FIG. 4d (Examples 6 through 25) was dimensioned to have overall horizontal (short axis) and vertical (long axis) dimensions of about 8.02 and 94.66 mm, respectively. The design of FIG. 4e (Examples 26 through 45) was dimensioned to have overall horizontal (short axis, conductive mesh region only; i.e., not including pads 454a and 454b) and vertical (long axis) dimensions of about 4.02 and 128.88 mm, respectively. In each case, the respective micropatterned conductor (discussed further below) was unbroken in the conductive areas of the design (e.g. areas 444, 444a, 444b of FIG. 4d) but broken in the non-conductive areas of the design (e.g., area 442a of FIG. 4d).

Micropatterned Conductors

The silver metal layer discussed above was processed to form traces arranged in a regular square repeating pattern. For the antennas of Examples 2, 3, and 6 through 45, the pitch of the traces (i.e., the nominal dimension of the length of a side of the square unit cell) was 200 microns along both orthogonal in-plane axes. For the antenna of Example 4 (FIG. 4c), the pitch of the traces was 50 microns along both orthogonal in-plane axes. For the antenna of Example 5 (also FIG. 4c), the pitch of the traces was 50 microns along both orthogonal in-plane axes. As shown in Table 1 below, a trace width of 2 microns was used for some embodiments, and a trace width of 5 microns was used for other embodiments, yielding the open area fractions listed in the table. The square repeating pattern was unbroken (see e.g. FIG. 6a) in the regions of each antenna that were intended to be electrically conductive, i.e., in the portions forming the respective antenna. For the above-described silver mesh conductor patterns, where 2 micron traces were arranged on a square grid with a pitch of 200 microns (98% open area fraction), the effective sheet resistance was measured to be in ranges from 80 to 150, 10 to 13, 10 to 13, 5 to 6, 3 to 6, and 3 to 5 ohms per square for target metal thicknesses of 30 nm, 60 nm, 100 nm, 300 nm, 500 nm, and 700 nm respectively. For the above-described silver mesh conductor patterns, where 5 micron traces were arranged on a square grid with a pitch of 200 microns (95% open area fraction), the effective sheet resistance was measured to be in ranges from 40 to 60, 5 to 7, 5 to 7, 2.5 to 5, 1.5 to 2.5, and 1 to 2 ohms per square for target metal thicknesses of 30 nm, 60 nm, 100 nm, 300 nm, 500 nm, and 700 nm respectively. In the portions intended to be electrically non-conductive, regular breaks were used to render the traces collectively non-conductive (see e.g. FIG. 6b). For example, for the antennas of Examples 2, 3, and 6-45, eight breaks for each unit square were arranged as shown in FIG. 6b, the length of each break being 6 micrometers. Various thicknesses of the silver metal were used, the thickness also being listed in Table 1.

TABLE 1

| Example | Antenna design | Trace width (microns) | Open area (%) | Metal thickness (nm) | Dmax (cm) | Resistance (Ω) |
|---|---|---|---|---|---|---|
| 2 | FIG. 4a | 5 | 95 | 100 | NR | 9.5k, 9.1k, 9.1k |
| 3 | FIG. 4b | 2 | 98 | 100 | NR | 32k, 30k |
| 4 | FIG. 4c | 2 | 92 | 700 | NR | 807 |
| 5 | FIG. 4c | 5 | 81 | 700 | NR | 370 |
| 6 | FIG. 4d | 2 | 98 | 30 | NR | 2.09k |
| 7 | FIG. 4d | 2 | 98 | 60 | 35 | 180 |
| 8 | FIG. 4d | 2 | 98 | 60 | 34 | 219 |
| 9 | FIG. 4d | 2 | 98 | 60 | 20 | 204 |
| 10 | FIG. 4d | 2 | 98 | 100 | 28 | 185 |
| 11 | FIG. 4d | 2 | 98 | 100 | 23 | 190 |
| 12 | FIG. 4d | 2 | 98 | 100 | 24 | 184 |
| 13 | FIG. 4d | 2 | 98 | 300 | 60 | 90 |
| 14 | FIG. 4d | 2 | 98 | 500 | 50 | 73 |
| 15 | FIG. 4d | 2 | 98 | 700 | 62 | 43 |
| 16 | FIG. 4d | 5 | 95 | 30 | 5 | 810 |
| 17 | FIG. 4d | 5 | 95 | 60 | 44 | 102 |
| 18 | FIG. 4d | 5 | 95 | 60 | 42 | 117 |
| 19 | FIG. 4d | 5 | 95 | 60 | 43 | 100 |
| 20 | FIG. 4d | 5 | 95 | 100 | 18 | 84 |

TABLE 1-continued

| Example | Antenna design | Trace width (microns) | Open area (%) | Metal thickness (nm) | Dmax (cm) | Resistance (Ω) |
|---|---|---|---|---|---|---|
| 21 | FIG. 4d | 5 | 95 | 100 | 34 | 96 |
| 22 | FIG. 4d | 5 | 95 | 100 | 43 | 89 |
| 23 | FIG. 4d | 5 | 95 | 300 | 70 | 49 |
| 24 | FIG. 4d | 5 | 95 | 500 | 91 | 35 |
| 25 | FIG. 4d | 5 | 95 | 1000 | 190 | 38 |
| 26 | FIG. 4e | 2 | 98 | 30 | NR | 3.58k, 4.87k |
| 27 | FIG. 4e | 2 | 98 | 60 | 22 | 339 |
| 28 | FIG. 4e | 2 | 98 | 60 | 17 | 402 |
| 29 | FIG. 4e | 2 | 98 | 60 | 27 | 419 |
| 30 | FIG. 4e | 2 | 98 | 100 | 14 | 431 |
| 31 | FIG. 4e | 2 | 98 | 100 | 8 | 435 |
| 32 | FIG. 4e | 2 | 98 | 100 | 19 | 396 |
| 33 | FIG. 4e | 2 | 98 | 300 | 27 | 229 |
| 34 | FIG. 4e | 2 | 98 | 500 | 41 | 166 |
| 35 | FIG. 4e | 2 | 98 | 500 | 37 | 205 |
| 36 | FIG. 4e | 5 | 95 | 30 | NR | 2k, 1.5k |
| 37 | FIG. 4e | 5 | 95 | 60 | 29 | 197 |
| 38 | FIG. 4e | 5 | 95 | 60 | 38 | 250 |
| 39 | FIG. 4e | 5 | 95 | 60 | 25 | 205 |
| 40 | FIG. 4e | 5 | 95 | 100 | 38 | 191 |
| 41 | FIG. 4e | 5 | 95 | 100 | 42 | 192 |
| 42 | FIG. 4e | 5 | 95 | 100 | 27 | 175 |
| 43 | FIG. 4e | 5 | 95 | 300 | 74 | 90 |
| 44 | FIG. 4e | 5 | 95 | 500 | 107 | 63 |
| 45 | FIG. 4e | 5 | 95 | 700 | 190 | 42 |

As is apparent by inspection of the table, no response was observed for any of the RFID devices operating at the HF frequency of 13.56 MHz. On the other hand, many of the RFID devices designed to operate at the UHF frequency of 915 MHz were found to operate successfully. The functionality of these latter devices indicate the suitability of the associated materials and designs for operation at other frequencies in the UHF band that stretches from 860 to 960 MHz.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. An RFID device, comprising:
an antenna comprising:
an insulating substrate; and
a first conductive micropattern disposed on or in the substrate, the first conductive micropattern defining a contiguous mesh conductor;
wherein the first conductive micropattern forms an antenna responsive to at least a frequency of 915 MHz;
wherein the first conductive micropattern comprises interconnected traces having a trace width in a range from 0.5 to 20 microns;
wherein the first conductive micropattern has a thickness of less than 2 microns; and
wherein the first conductive micropattern is characterized by an open area fraction of at least 80%; and
an integrated circuit configured to transmit and receive signals using the antenna;
wherein the antenna is tailored to yield a maximum distance at which an RFID reader operating at 1 Watt radiated power in a 902-928 MHz frequency hopping mode communicates with the device, the maximum distance being less than 30 centimeters or from 2 to 50 centimeters.

2. The device of claim 1, wherein the open area fraction is at least 90%.

3. The device of claim 1, wherein the first conductive micropattern is composed of an opaque material comprising a metal.

4. The device of claim 3, wherein the metal is selected from silver, gold, palladium, platinum, aluminum, copper, nickel, tin, alloys, and combinations thereof.

5. The device of claim 1, wherein the first conductive micropattern has a thickness in a range from 30 nanometers to 1 micron.

6. The device of claim 1, wherein the trace width is in a range from 1 to 10 microns.

7. The device of claim 1, wherein the trace width is in a range from 1.5 to 4 micrometers.

8. The device of claim 1, wherein the first conductive micropattern is characterized by an effective sheet resistance in a range from 0.1 to 200 ohms/square.

9. The device of claim 1, wherein the insulating substrate is transparent.

10. The device of claim 1, wherein the antenna has a visible light transmission value of greater than 70%.

11. The device of claim 1, wherein the antenna is tailored to yield a maximum distance at which an RFID reader operating at 1 Watt radiated power in a 902-928 MHz frequency hopping mode communicates with the device, the maximum distance being from 2.5 to 30 centimeters.

12. A system comprising the device of claim 1 in combination with a first RFID reader operating at between 0.2 Watt and 5 Watts radiated power at a frequency or frequencies between 860 MHz and 960 MHz, wherein a maximum distance at which the first RFID reader communicates with the device is less than 30 centimeters or from 2 centimeters to 50 centimeters.

13. The device of claim 1, wherein the maximum distance is less than 5 centimeters.

14. A card, comprising:
a card layer;
an antenna carried by the card layer; and
an integrated circuit configured to transmit and receive signals using the antenna;
wherein the antenna comprises a conductive micropattern defining a contiguous mesh conductor, the conductive micropattern forming an antenna responsive to at least a frequency of 915 MHz, the conductive micropattern comprising interconnected traces having a trace width in a range from 0.5 to 20 microns, wherein the first conductive micropattern has a thickness of less than 2 microns; and the conductive micropattern being characterized by an open area fraction of at least 80%; wherein the antenna is tailored to yield a maximum distance at which an RFID reader operating at 1 Watt radiated power in a 902-928 MHz frequency hopping mode communicates with the device, the maximum distance being less than 30 centimeters or from 2 to 50 centimeters.

15. The card of claim 14, wherein the card layer is light transmissive for visible wavelengths.

16. The card of claim 15, wherein the open area fraction is in a range from 95 to 98%.

17. The card of claim 14, wherein the first conductive micropattern is composed of an opaque material comprising a metal selected from silver, gold, palladium, platinum, aluminum, copper, nickel, tin, alloys, and combinations thereof.

18. The card of claim 14, wherein the first conductive micropattern has a thickness in a range from 30 nanometers to 1 micron.

19. The card of claim 14, wherein the trace width is in a range from 2 to 5 microns.

* * * * *

UNITED STATES PATENT AND TRADEMARK OFFICE
CERTIFICATE OF CORRECTION

| | | |
|---|---|---|
| PATENT NO. | : 8,998,099 B2 | Page 1 of 1 |
| APPLICATION NO. | : 13/880180 | |
| DATED | : April 7, 2015 | |
| INVENTOR(S) | : Frey et al. | |

It is certified that error appears in the above-identified patent and that said Letters Patent is hereby corrected as shown below:

In the Specification

Column 17,
Line 44, delete "2009." and insert -- 2009 (Attorney Docket 65462US002). --, therefor.

Line 63, delete "2009." and insert -- 2009 (Attorney Docket 65462US002). --, therefor.

Signed and Sealed this
Fifteenth Day of September, 2015

Michelle K. Lee
*Director of the United States Patent and Trademark Office*